United States Patent
Mehra

(10) Patent No.: US 10,200,344 B1
(45) Date of Patent: Feb. 5, 2019

(54) GTP FIREWALL FOR 3G GSM, 4G LTE AND INTEROPERABILITY BETWEEN 3G AND 4G SIGNALING DATA

(71) Applicant: Syniverse Technologies, LLC, Tampa, FL (US)

(72) Inventor: Karan Mehra, Wesley Chapel, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/041,914

(22) Filed: Jul. 23, 2018

Related U.S. Application Data

(60) Provisional application No. 62/576,644, filed on Oct. 24, 2017.

(51) Int. Cl.
  *H04L 29/06* (2006.01)
  *H04W 76/18* (2018.01)

(52) U.S. Cl.
  CPC ........ *H04L 63/0245* (2013.01); *H04L 63/029* (2013.01); *H04L 63/0254* (2013.01); *H04W 76/18* (2018.02)

(58) Field of Classification Search
  CPC ....................................................... H04L 63/02
  USPC ......... 726/11, 12, 13, 14; 713/151, 152, 153
  See application file for complete search history.

(56) References Cited

U.S. PATENT DOCUMENTS

| | | | |
|---|---|---|---|
| 5,606,668 A | 2/1997 | Shwed | |
| 7,865,944 B1 | 1/2011 | Shu et al. | |
| 9,572,037 B2 | 2/2017 | Puri et al. | |
| 2004/0109459 A1* | 6/2004 | Madour | H04L 63/02 370/401 |
| 2008/0010676 A1* | 1/2008 | Dosa Racz | H04L 63/029 726/11 |
| 2016/0050568 A1* | 2/2016 | Pudney | H04W 12/10 713/151 |

OTHER PUBLICATIONS

Juniper Networks, Inc., Concepts & Examples ScreenOS Reference Guide, 2260 pages, 6.3.0, Rev. 02, Dec. 10, 2012.
Check Point Software Technologies LTD., Firewall-1 Gx 5.0 Administration Guide, 63 pages, Sep. 27, 2011.

\* cited by examiner

*Primary Examiner* — Izunna Okeke
(74) *Attorney, Agent, or Firm* — Molly L. Sauter; Smith & Hopen, P.A.

(57) ABSTRACT

GTP firewall service to block or allow GTP-C v1 messages from specific SGSN/GGSN and GTP-C v2 messages from specific SGW/PGW to prevent fraudulent activity occurring from any specific serving node or home node. GTP Traffic from specific SGSN (3G) or SGW (4G) can be blocked going to specific home operator, including 3G GSM to 4G LTE and 4G LTE to 3G GSM protocol interoperability provided by GTP Firewall. Individual Information Elements within GTP-C v1 and GTP-C v2 messages will be monitored based on home and serve operator configuration as well as GTP messages and Information Elements mapped from GTP-C v1 to GTP-C v2 for 3G GSM to 4G LTE interoperability and GTP-C v2 to GTP-C v1 for 4G LTE to 3G GSM interoperability.

19 Claims, 16 Drawing Sheets

GTP FIREWALL FOR 3G GSM, 4G LTE AND INTEROPERABILITY BETWEEN 3G AND 4G SIGNALING DATA

CROSS-REFERENCE TO RELATED APPLICATIONS

This application claims priority to U.S. Provisional Patent Application No. 62/576,644, entitled "GTP FIREWALL FOR 3G GSM AND 4G LTE SIGNALING DATA TRAFFIC," filed Oct. 24, 2017, the entirety of which is incorporated herein by reference.

BACKGROUND OF THE INVENTION

1. Field of the Invention

This invention relates to telecommunications. More specifically, it relates to a GTP (General Radio Packet Service (GPRS) Tunneling Protocol) firewall that enables interoperability between 3G GSM (Global System for Mobile Communications) and 4G LTE (Long Term Evolution) signaling data traffic.

2. Description of the Related Art

A cellular network architecture consists of base stations and a core network. The base stations provide radio access to user devices, such as mobile phones. One or more core networks connect the user devices to voice and data services, such as the internet. The General Packet Radio Service (GPRS) network provides a gateway for user devices to access the internet through different frequency channels for uploading and downloading data.

GPRS Tunneling Protocol (GTP) is known as a group of IP-based communications protocols used to carry general packet radio services (GPRS) within GSM, UMTS (Universal Mobile Telecommunications System) and LTE networks. GPRS is a data network architecture which provides always-on packet switched data services to corporate networks and the internet. The integration of GPRS to GSM provides mobile phone, mobile Internet, and VPN services to subscribed users, however, the system introduces new security risks to networks, since GTP does not inherently provide any security or encryption of user data.

Additionally, when people are roaming with a mobile device, the device often needs to switch between 3G GSM and 4G LTE networks, depending upon what coverage the mobile device has in a particular geographical area. For example, if a network currently serving the mobile device only supports 3G GSM and the home network of the user device only supports 4G LTE, interoperability between 3G GSM and 4G LTE needs to be provided for the mobile device. Additionally, if a network currently serving the mobile device only supports 4G LTE and the home network of the mobile device only supports 3G GSM, interoperability between 4G LTE and 3G GSM needs to be provided.

Accordingly, there is a need in the art for a system and method that provides security for GPRS Tunneling Protocol (GTP) while also providing interoperability between different protocols, such as when roaming between 3G GSM and 4G LTE networks.

However, in view of the art considered as a whole at the time the present invention was made, it was not obvious to those of ordinary skill in the field of this invention how the shortcomings of the prior art could be overcome.

SUMMARY OF THE INVENTION

In various embodiments, the present invention provides a system and method for providing firewall services between different mobile IP-based networks. In a particular embodiment, the present invention provides a system and method for providing firewall services and interoperability between 3G GSM networks and 4G LTE networks.

In one embodiment, the present invention includes a method of providing firewall services between mobile IP-based networks, which includes, monitoring traffic on an IP (Internet Protocol) network using a GTP (General Packet Radio Service (GPRS) Tunneling Protocol) firewall, wherein the GTP firewall is positioned between a Serve side of the IP network operating under a first protocol and a Home side of the IP network operating under a second protocol, and wherein the traffic comprises data signaling messages. The method further includes, providing protocol interoperability between the first protocol and the second protocol by mapping the data signaling messages received at the Serve side using the first protocol to create data signaling messages at the Home side using the second protocol and providing protocol interoperability between the second protocol and the first protocol by mapping the data signaling messages received at the Home side using the second protocol to create data signaling messages at the Serve side using the first protocol. The method additionally includes, blocking or allowing the transmission of traffic through the GTP firewall based at least upon the data signaling messages at the Serve side and at the Home side of the IP Network.

In some embodiments, the IP-based network is selected from a Global System for Mobile Communications (GSM) Roaming Exchange (GRX) network and an Internetwork Packet Exchange (IPX) network. The traffic being transmitted may additionally be selected from, GTP-C v1 (General Packet Radio Service (GPRS) Tunneling Protocol Control Plane Version-1), GTP-C v2 (General Packet Radio Service (GPRS) Tunneling Protocol Control Plane Version-2) and GTP-U v1 (General Packet Radio Service (GPRS) Tunneling Protocol User Plane Version-1). The traffic may further include data traffic.

In a particular embodiment, the first protocol is a 3G GSM protocol and the second protocol is a 4G LTE (Long Term Evolution) protocol. In another embodiment, the first protocol is a 4G LTE protocol and the second protocol is a 3G GSM protocol.

In another embodiment, the present invention provides a mobile IP-based network system which includes, a Serve side of an IP network comprising one or more serve operators operating under a first protocol and a Home side on the IP network comprising one or more home operators operating under a second protocol. The system further includes, a GTP (General Packet Radio Service (GPRS) Tunneling Protocol) firewall, wherein the GTP firewall positioned between the Serve side of the IP network and the Home side of the IP network, wherein the traffic comprises data signaling messages and wherein the GTP firewall is configured to monitor traffic on the IP (Internet Protocol) network, provide protocol interoperability between the first protocol and the second protocol by mapping the data signaling messages received at the Serve side using the first protocol to create data signaling messages at the Home side using the second protocol, provide protocol interoperability between the second protocol and the first protocol by mapping the data signaling messages received at the Home side using the second protocol to create data signaling messages at the Serve side using the first protocol and block or allow the transmission of traffic through the GTP firewall based at least upon the data signaling messages at the Serve side and at the Home side of the IP Network.

In general, the GTP firewall of the present invention will allow or block GTP-C v1 messages between specific Serving GPRS Support Nodes (SGSNs) and specific Gateway GPRS Supports Nodes (GGSNs) in 3G GSM and will allow or block GTP-C v2 messages between specific Serving Gateways (SGWs) and specific Packet Data Network (PDN) Gateways (PWGs) in 4G LTE to prevent fraudulent activity occurring from any specific serving node or home node. The GTP firewall additionally provides interoperability between the 3G GSM protocol and the 4G LTE protocol.

As such, the present invention provides an improved system and method for establishing GTP firewall services and interoperability between different IP-based networking protocols, including, but not limited to, 3G GSM and 4G LTE protocols.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

The present invention provides a GTP firewall that covers both 3G GSM and 4G LTE networks and bridges the gap between 3G GSM and 4G LTE data roaming. In various embodiments, the present invention provides firewall services for: 3G GSM Data Traffic, 4G LTE Data Traffic, 3G GSM to 4G LTE protocol interoperability data traffic, and 4G LTE to 3G GSM protocol interoperability data traffic. The GTP firewall is effective in preventing fraudulent activity from occurring on any serving node or home node.

Figure 1:
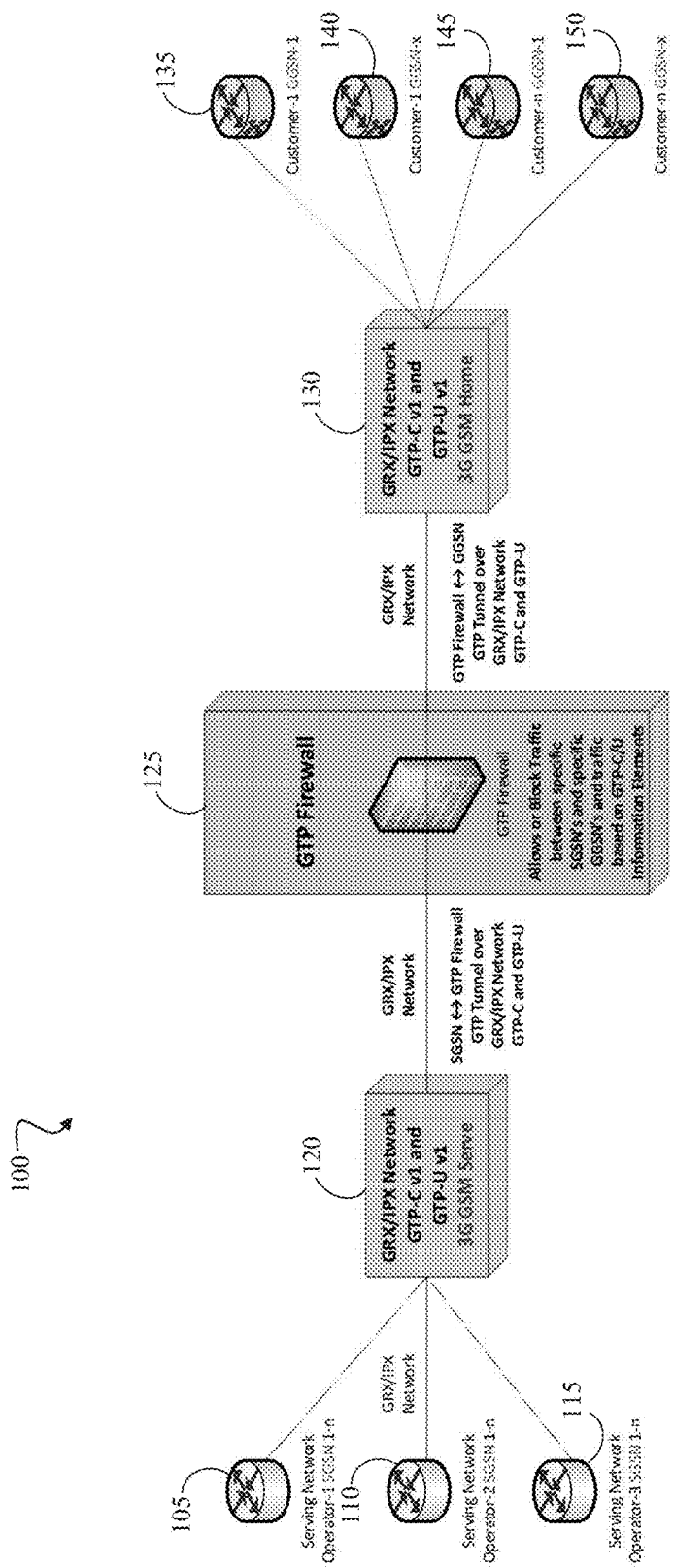
FIG. 1 illustrates traffic flow in a network comprising a GTP firewall for allowing and blocking traffic between a 3G GSM Serve node and a 3G GSM Home node, in accordance with an embodiment of the present invention.

With reference to FIG. 1, in one embodiment of the present invention, a system 100 is provided that includes a GTP firewall 125 positioned between a 3G GSM Serve side 120 of an IP-based network and a 3G GSM Home side 130 of the network. In this embodiment, the 3G GSM Serve side 120 may be a Serving GPRS Support Node (SGSN) implementing a GRX (GPRS Roaming Exchange) or IPX (Internet Protocol Exchange) utilizing GTP-C v1 and GTP-U v1 data signaling to communicate on the network. Network connectivity to remote switches is established through a secure IPX Network. Serving Network Operators 105, 110, 115 are mobile networks connected to the network on the Serve side 120. The 3G GSM Home side 130 may be a Gateway GPRS Support Node (GGSN) also implementing a GRX (GPRS Roaming Exchange) or IPX (Internet Protocol Exchange) utilizing GTP-C v1 and GTP-U v1 data signaling to communicate on the network. Customers of the network 135, 140, 145, 150 are connected to the network on the Home side 130.

In operation of the system illustrated in FIG. 1, the GTP firewall 125 of the present invention is effective in allowing or blocking traffic between specific SGSNs operating on the Serve side 120 of the network and specific GGSNs operating on the Home side 130 of the network. The GTP firewall 125 also allows or blocks traffic between specific GGSNs operating on the Home side 130 of the network and specific SGSNs operating on the Serve side 120 of the network.

The GTP firewall 125 is also effective in allowing or blocking traffic based upon Information Elements (IEs) present in the GTP-C and the GTP-U data signaling. Information elements (IEs) are included in all GPRS tunneling protocol (GTP) control message packets to provide information about GTP tunnels, such as creation, modification, deletion, and status. To allow or block traffic, the GTP firewall 125 may inspect the GTP-C v1 and GTP-U v1 data being transmitted over the network. The GTP firewall then utilizes a set of predetermined criteria to either allow or block the transmission of the traffic across the GTP firewall 125. The GTP firewall 125 may use the source IP, source port, destination IP, destination port, protocol and the Tunnel Endpoint IDs (TEID) as criteria. The TEID uniquely identifies the GTP tunnel endpoints.

Figure 2:
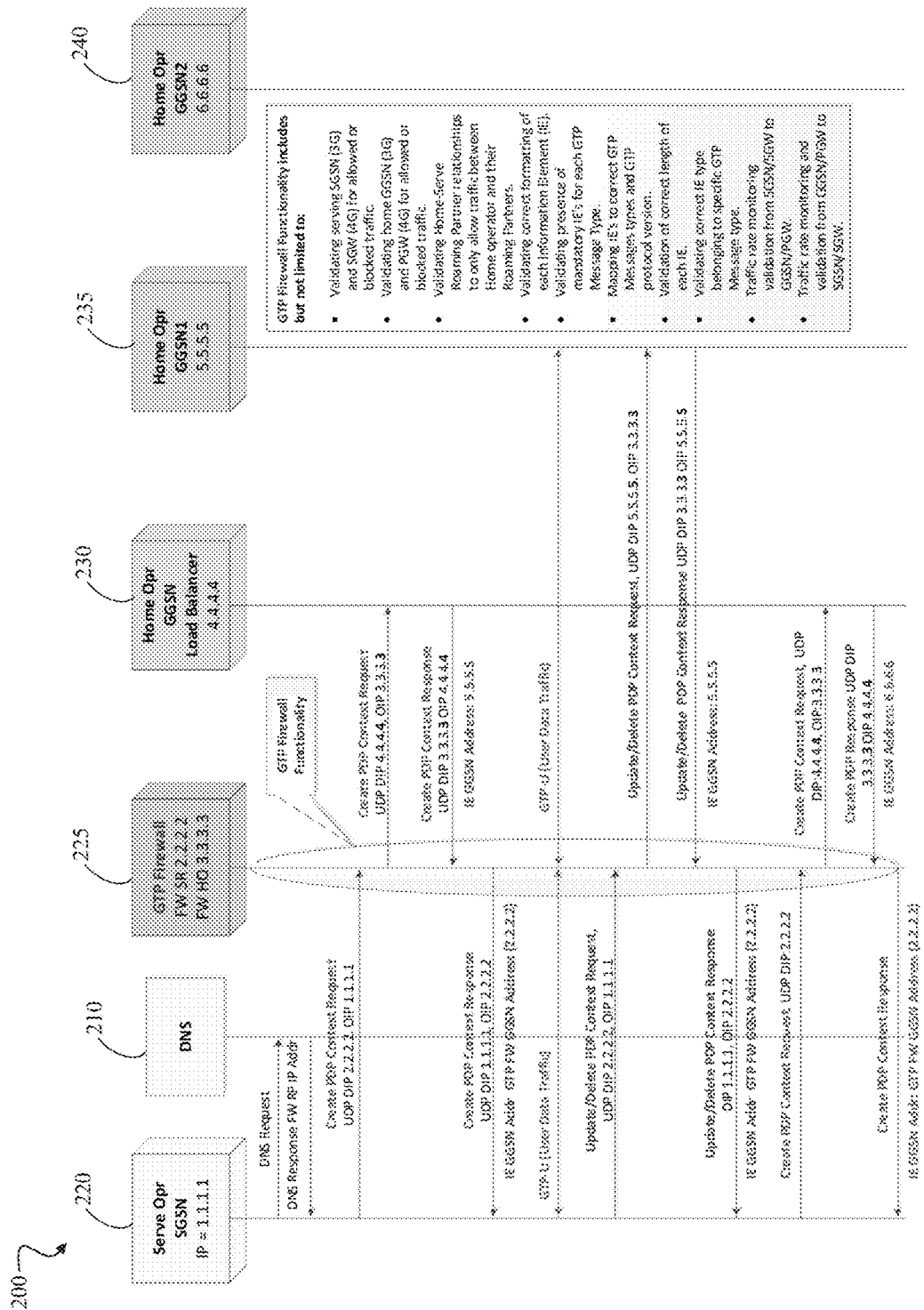
FIG. 2 illustrates a GTP firewall component diagram for a 3G GSM Serve node and a 3G GSM Home node, in accordance with an embodiment of the present invention.

FIG. 2 illustrates a GTP firewall component diagram 200 for the 3G GSM Serve and 3G GSM Home configuration illustrated in FIG. 1. As shown in FIG. 2, an SGSN serve operator 220 performs a DNS query to get an IP address from a DNS server 210. In a particular embodiment, the GTP firewall 225 may be configured to allow or block 3G GSM "Create PDP Context Request" messages from being transmitted to a GGSN Home operator 235, 240. The GTP firewall 225 may be configured to block/allow messages from specific SGSN mobile operators, from SGSNs in specific countries or SGSN IP addresses with specific Information Elements containing specific configured values.

The GTP firewall 225 functionality may include, validating serving SGSN for allowed or blocked traffic, validating home GGSN for allowed or blocked traffic, validating Home-Serve roaming partner relationships to only allow traffic between home operators and their roaming partners, validating correct formatting of each Information Element (IE), validating the presence of mandatory IEs for each GTP message type, mapping IEs to correct GTP message types and GTP protocol version, validating correct IE type belonging to specific GTP message type, performing traffic rate monitoring validation from SGSNs to GGSNs and performing traffic rate monitoring validation from GGSNs to SGSNs.

The embodiment show in FIG. 2 includes a home operator GGSN load balancer 230 to optimize the wireless service to all of the subscribers. In an additional embodiment, the GGSN load balancer 230 could be removed from the network.

As such, FIG. 2 depicts GTP firewall 225 traffic flow between a 3G GSM Serve 220 and a 3G GSM Home 230. In this scenario, GTP-C v1 messages, along with their associated Information Elements (IEs), are validated and passed to the other side based upon GTP firewall 225 rules (functionality). In this embodiment, the same 3G GTP-C v1 and GTP-U v1 protocol is used on the Serve side 220 and the Home side 230 of the Network with GTP firewall 225 in the middle. GTP-C v1 Messages and Information Elements (IEs) are documented in 3GPP TS 29.060. GTP-U v1 Messages and Information Elements (IEs) are documented in 3GPP TS 29.281. In operation, the GTP firewall 225 monitors GTP-C v1, and GTP-U v1 traffic and applies firewall rules. Home operators using the GTP firewall 225 will route their APN (Access Point Names) to operator-specific GTP firewall 225 public IP Address. The GTP firewall 225 either blocks or allows traffic and sends the allowed traffic to its true destination. The true destination is GGSN IP address based on APN, subscriber IMSI and/or session Tunnel End Point Identifier (TEID).

Figure 3:
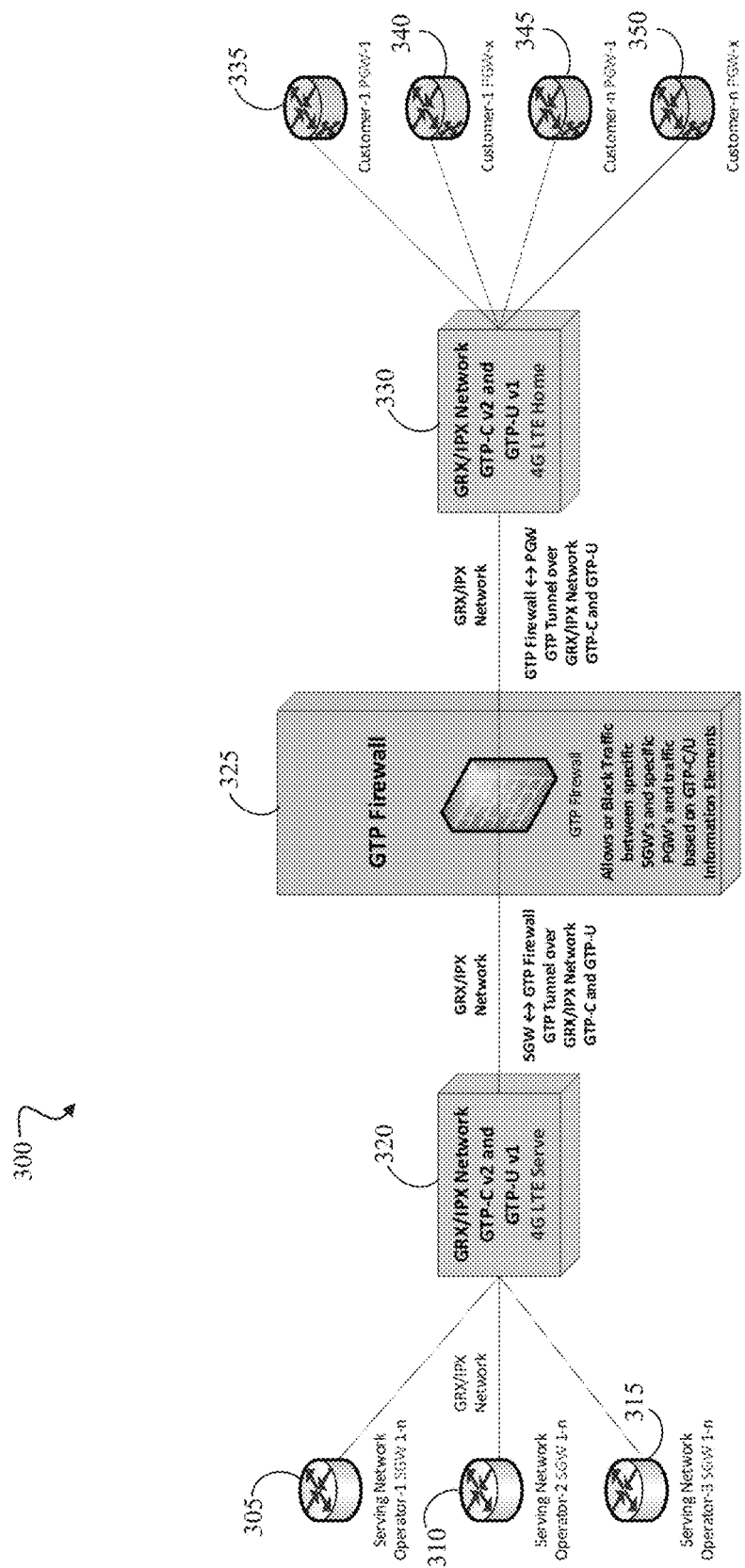
FIG. 3 illustrates traffic flow in a network comprising a GTP firewall for allowing and blocking traffic between a 4G LTE Serve node and a 4G LTE Home node, in accordance with an embodiment of the present invention.

With reference to FIG. 3, in one embodiment of the present invention, a system 300 is provided that includes a GTP firewall 325 positioned between a 4G LTE Serve side 320 of an IP-based network and a 4G LTE Home side 330 of the network. In this embodiment, the 4G LTE Serve side 320 may be a Serving Gateway (SGW) implementing a GRX (GPRS Roaming Exchange) or IPX (Internet Protocol Exchange) utilizing GTP-C v2 and GTP-U v1 data signaling to communicate on the network. Network connectivity to remote switches is established through a secure IPX Network. Serving Network Operators 305, 310, 315 are mobile networks connected to the network on the Serve side 320. The 4G LTE Home side 330 may be a Packet Data Network (PDN) Gateway (PGW) also implementing a GRX (GPRS Roaming Exchange) or IPX (Internet Protocol Exchange) utilizing GTP-C v2 and GTP-U v1 data signaling to communicate on the network. Customers of the network 335, 340, 345, 350 are connected to the network on the Home side 330.

In operation of the system illustrated in FIG. 3, the GTP firewall 325 of the present invention is effective in allowing or blocking traffic between specific SGWs operating on the Serve side 320 of the network and specific PGWs operating on the Home side 330 of the network. The GTP firewall 325 also allows or blocks traffic between specific PGWs operating on the Home side 330 of the network and specific SGWs operating on the Serve side 320 of the network.

The GTP firewall 325 is also effective in allowing or blocking traffic based upon Information Elements (IEs) present in the GTP-C and the GTP-U data signaling. Information elements (IEs) are included in all GPRS tunneling protocol (GTP) control message packets to provide information about GTP tunnels, such as creation, modification, deletion, and status. To allow or block traffic, the GTP firewall 325 may inspect the GTP-C v2 and GTP-U v1 data being transmitted over the network. The GTP firewall then utilizes a set of predetermined criteria to either allow or block the transmission of the traffic across the GTP firewall 325. The GTP firewall 325 may use the source IP, source port, destination IP, destination port, protocol and the Tunnel Endpoint IDs (TEID) as criteria. The TEID uniquely identifies the GTP tunnel endpoints.

As such, FIG. 3 depicts GTP firewall 325 traffic flow between a 4G LTE Serve 320 and a 4G LTE Home 330. In this scenario, GTP-C v2 messages, along with their associated Information Elements (IEs), are validated and passed to the other side based upon GTP firewall 325 rules (functionality). In this embodiment, the same 4G GTP-C v2 and GTP-U v1 protocol is used on the Serve side 320 and the Home side 330 of the Network with the GTP firewall 325 in the middle. GTP-C v2 messages and Information Elements (IEs) are documented in 3GPP TS 29.060.

Figure 4:
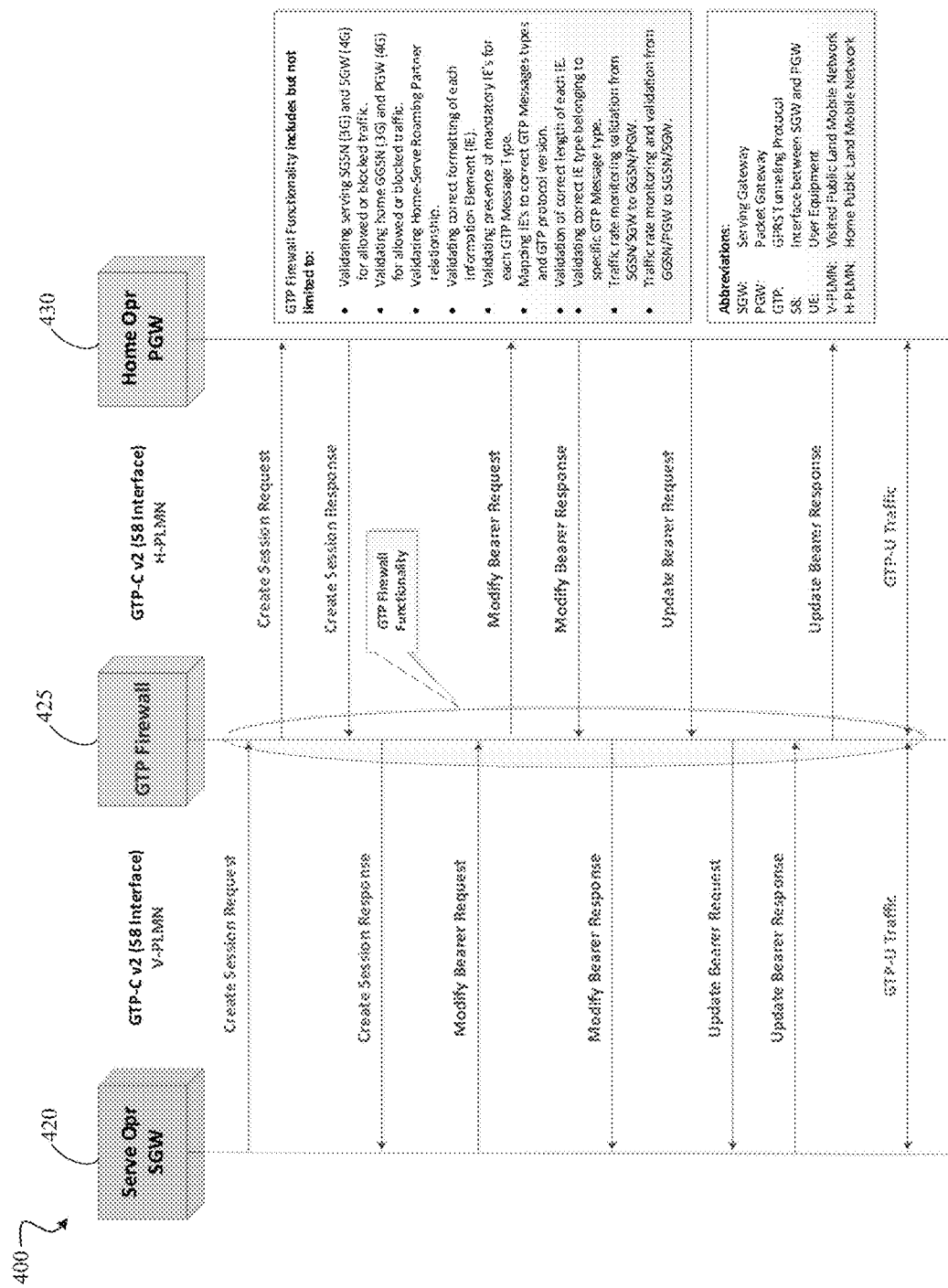
FIG. 4 illustrates a GTP firewall component diagram for a 4G LTE Serve node and a 4G LTE Home node, in accordance with an embodiment of the present invention.

FIG. 4 illustrates a GTP firewall component diagram 400 for the 4G LTE Serve and 4G LTE Home configuration illustrated in FIG. 3. As shown in FIG. 4, an SGW serve operator 420, in a particular embodiment, the GTP firewall 425 may be configured to allow or block 4G LTE "Create Session Request" messages from being transmitted to a PGW Home operator 430. The GTP firewall 425 may be configured to block/allow messages from specific SGW mobile operators, from SGWs in specific countries or SGW IP addresses with specific Information Elements containing specific configured values.

The GTP firewall 425 functionality may include, validating serving SGWs for allowed or blocked traffic, validating home PGWs for allowed or blocked traffic, validating Home-Serve roaming partner relationships to only allow traffic between home operators and their roaming partners, validating correct formatting of each Information Element (IE), validating the presence of mandatory IEs for each GTP message type, mapping IEs to correct GTP message types and GTP protocol version, validating correct IE type belonging to specific GTP message type, performing traffic rate monitoring validation from SGWs to PGWs and performing traffic rate monitoring validation from PGWs to SGWs.

As such, FIG. 4 depicts GTP firewall 425 traffic flow between 4G Serve 420 and 4G Home 430. In this scenario, GTP-C v2 messages, along with their associated Information Elements (IEs), are validated and passed to the other side based on GTP firewall rules (functionality). The same 4G GTP-C v2 and GTP-U v1 protocol is used on the Serve side 420 and the Home side 430 of the Network 400 with the GTP firewall in the middle 425. In operation, the GTP firewall 425 monitors GTP-C v2, and GTP-U v1 traffic and applies firewall rules. Home operators using the GTP firewall 425 will route their APN (Access Point Names) to operator-specific GTP firewall 425 public IP Address. The GTP firewall 425 either blocks or allows traffic and sends the allowed traffic to its true destination. The true destination is PGW IP address based on APN, subscriber IMSI and/or session Tunnel End Point Identifier (TEID).

Figure 5:
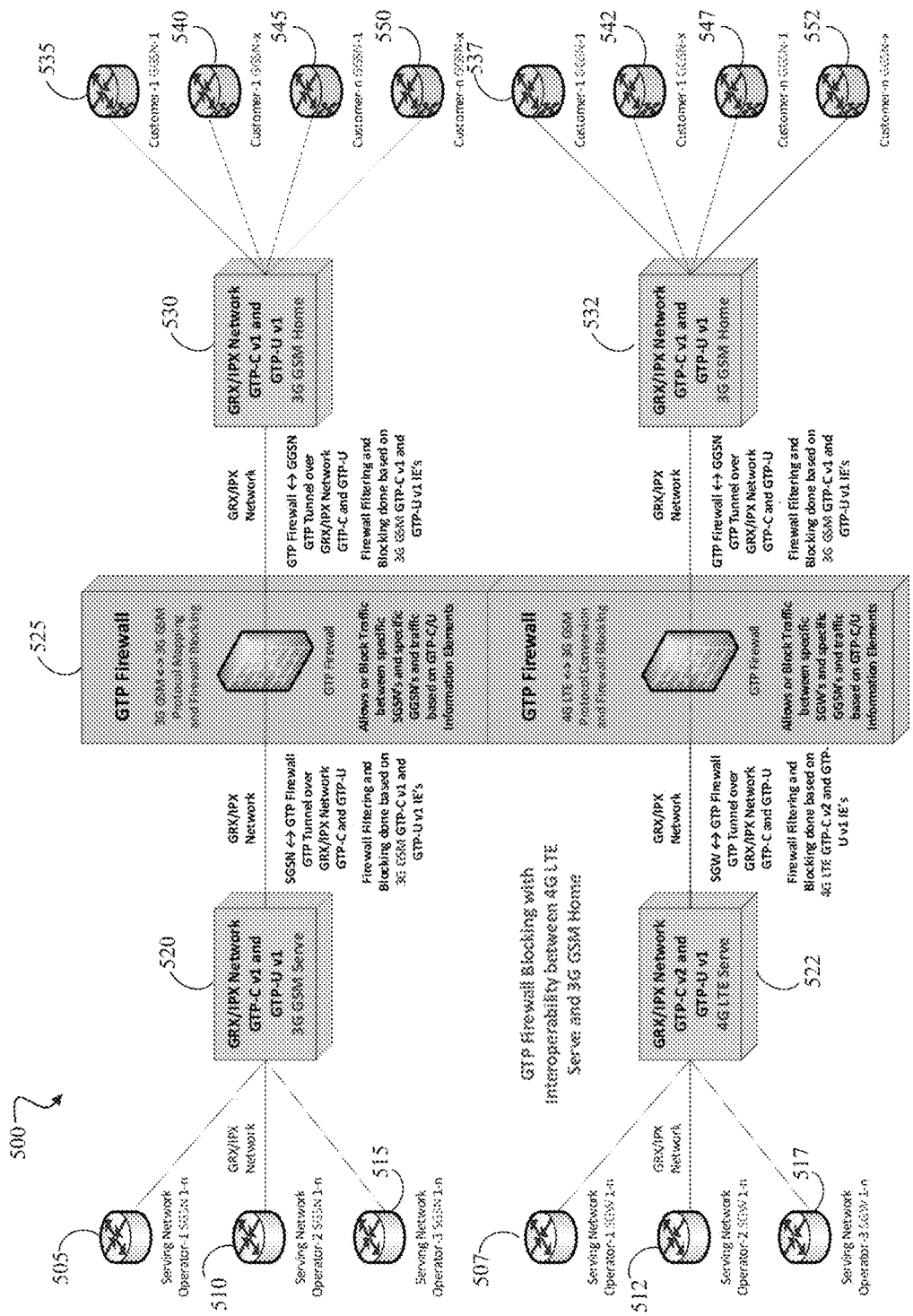
FIG. 5 illustrates traffic flow in a network comprising a GTP firewall for allowing and blocking traffic between a 3G GSM Serve node and a 3G GSM Home node and between a 4G LTE Serve node and a 3G GSM Home node, in accordance with an embodiment of the present invention.

With reference to FIG. 5, in an additional embodiment, the present invention provides a network configuration 500 that provides GTP firewall protection between both 3G GSM Serve (SGSN) and 3G GSM Home (GGSN) in addition to GTP firewall blocking with interoperability between 4G LTE Serve (SGW) and 3G GSM Home (GGSN). In this embodiment, the GTP firewall 525 will be effective in blocking or allowing data traffic from multiple SGSNs 505, 510, 515 operating on a 3G GSM serve side 520 of the network 500 to multiple customers 535, 540, 545, 550 operating on a 3G GSM Home side 530 of the network. In operation, firewall filtering and blocking will be performed by the GTP firewall 525 based upon 3G GSM GTP-C v1 and GTP-U v1 messages and associated Information Elements, as previously described with reference to FIG. 1.

Additionally, in the embodiment of FIG. 5, the GTP firewall 525 will be effective in allowing or blocking traffic between specific 4G LTE SGW's 507, 512, 517 operating on a 4G LTE Serve 522 of the network 500 and specific customers 537, 542, 547, 552 operating on a 3G GSM Home side 532 of the network 500. In operation, the GTP firewall 525 will block or allow data traffic and provide protocol interoperability between 4G LTE SGWs and 3G GGSNs operating on opposite sides of the GTP firewall 525.

Figure 6:
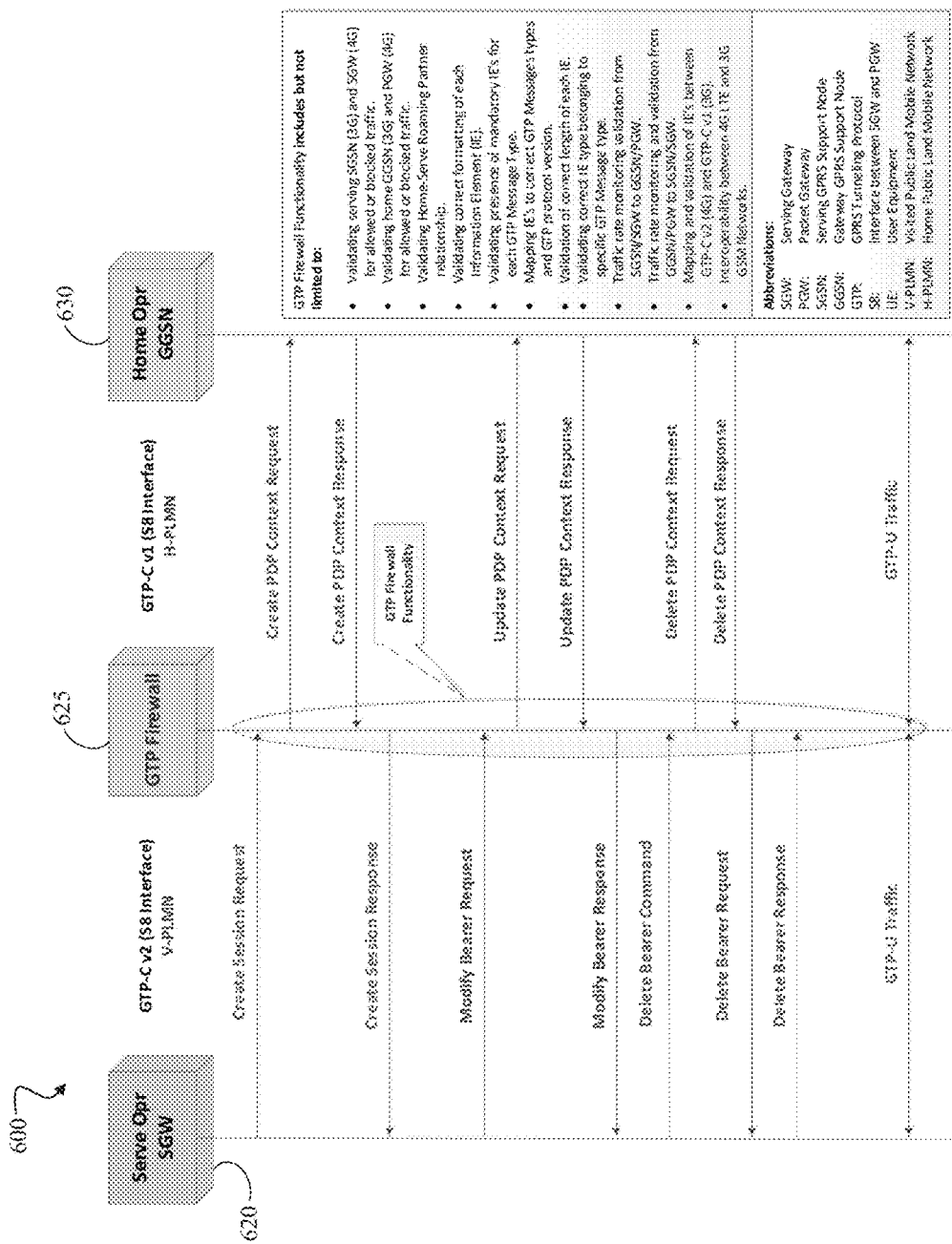
FIG. 6 illustrates a GTP firewall component diagram for a 3G GSM Serve node, a 4G LTE Serve node and a 3G GSM Home node, in accordance with an embodiment of the present invention.

FIG. 6 illustrates a GTP firewall component diagram for the 4G LTE Serve and the 3G GSM Home element of FIG. 5. In this embodiment the network configuration 600 includes a GTP firewall 625 positioned between an SGW Serve operator 620 and a GGSN Home operator 630. Since the SGW Serve operates under the 4G LTE protocol and the GGSN Home operates under the 3G GSM protocol, the GTP firewall 625 must provide interoperability in addition to block/allow functionality. For example, for 4G LTE to 3G GSM interoperability, the GTP firewall 625 will map "Create Session Request" messages received on the 4G LTE side to "Create PDP Context Request" messages on the 3G GSM side and will apply allow/block rules on both the 4G LTE side and the 3G GSM side. This protocol mapping and allowing/blocking scenario applies for all 4G LTE GTP-C v2 messages that get mapped to their equivalent 3G GSM GTP-C v1 messages, along with their respective Information Elements.

The GTP firewall 625 functionality may include, validating serving SGSNs (3G) and SGWs (4G) for allowed or blocked traffic, validating home GGSN (3G) and PGWs (4G) for allowed or blocked traffic, validating Home-Serve roaming partner relationships to only allow traffic between home operators and their roaming partners, validating correct formatting of each Information Element (IE), validating the presence of mandatory IEs for each GTP message type, mapping IEs to correct GTP message types and GTP protocol version, validating correct IE type belonging to specific GTP message type, performing traffic rate monitoring validation from SGSNs/SGWs to GGSNs/PGWs, performing traffic rate monitoring validation from GGSNs/PGWs to SGSNs/SGWs and establishing interoperability between 4G LTE and 3G GSM networks.

Figure 7:
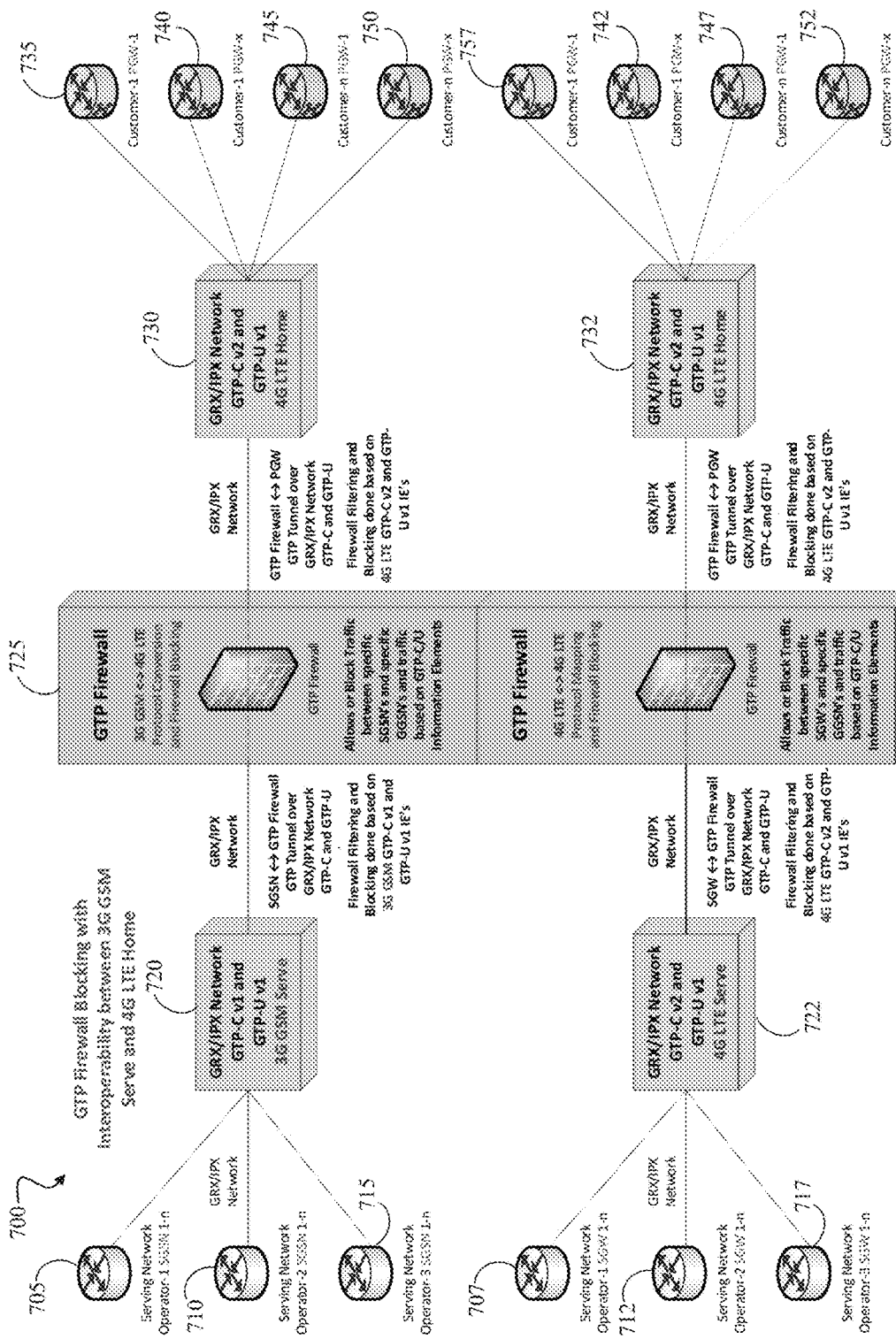
FIG. 7 illustrates traffic flow in a network comprising a GTP firewall for allowing and blocking traffic between a 4G LTE Serve node and a 4G LTE Home node and between a 3G GSM Serve node and a 4G LTE Home node, in accordance with an embodiment of the present invention.

With reference to FIG. 7, in another embodiment, the present invention provides a network configuration 700 that provides GTP firewall protection between both 4G LTE Serve (SGW) and 4G LTE Home (PGW) in addition to GTP firewall blocking with interoperability between 3G GSM Serve (SGSN) and 4G LTE Home (GSW). In this embodiment, the GTP firewall 725 will be effective in blocking or allowing data traffic from multiple SGWs 707, 712, 717 operating on a 4G LTE serve side 722 of the network 700 to multiple customers 757, 742, 747, 752 operating on a 4G LTE Home side 732 of the network. In operation, firewall filtering and blocking will be performed by the GTP firewall 725 based upon 3G GSM GTP-C v1 and GTP-U v1 messages and associated Information Elements, as previously described with reference to FIG. 3.

Additionally, in the embodiment of FIG. 7, the GTP firewall 725 will be effective in allowing or blocking traffic between specific 3G GSM SGSNs 705, 710, 715 operating on a 3G GSM Serve side 720 of the network 700 and specific customers 735, 740, 745, 750 operating on a 4G LTE Home side 730 of the network 700. In operation, the GTP firewall 725 will block or allow data traffic and provide protocol interoperability between 3G SGSNs and 4G LTE PGWs operating on opposite sides of the GTP firewall 725.

Figure 8:
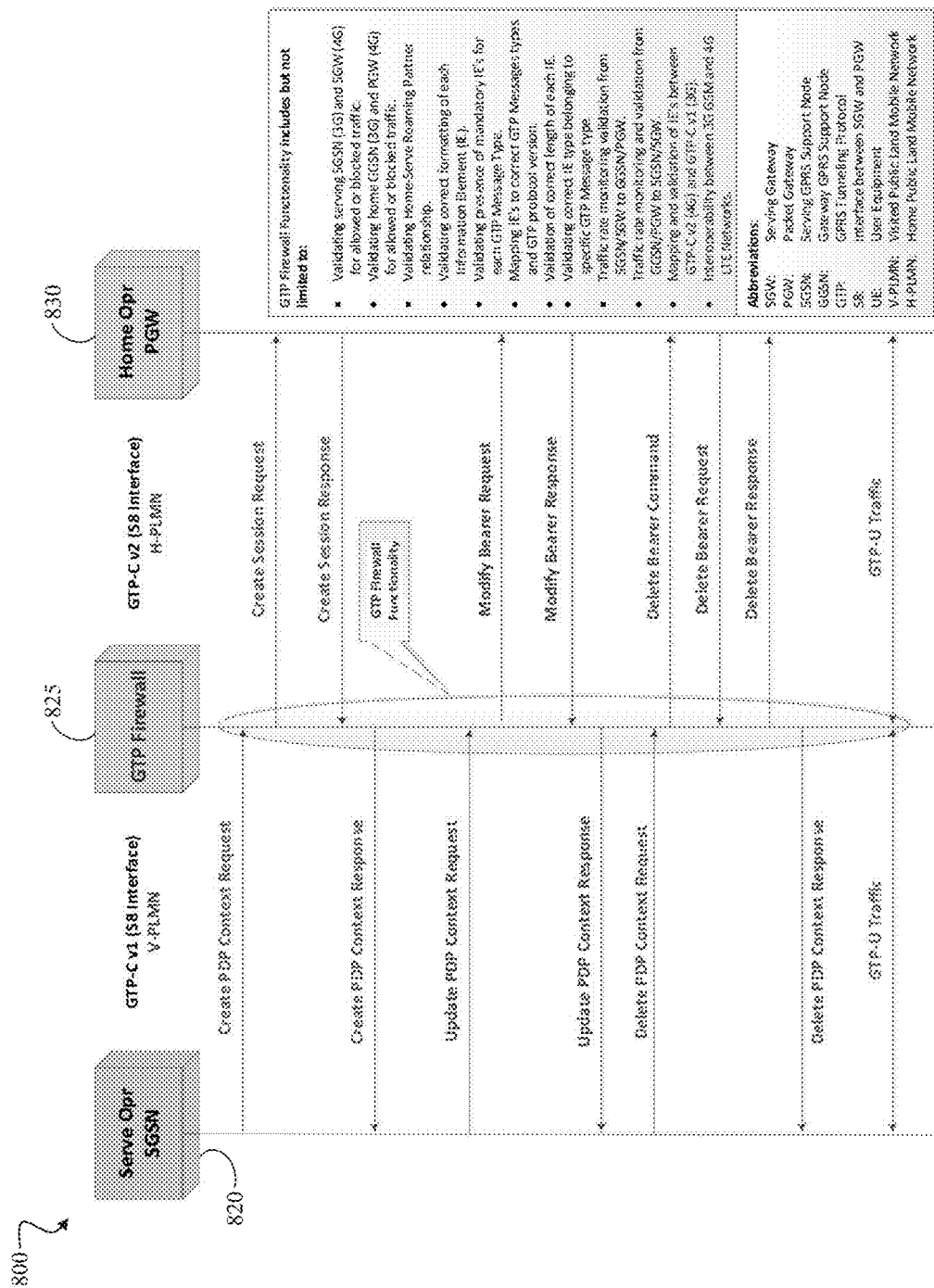
FIG. 8 illustrates a GTP firewall component diagram for a 4G LTE Serve node, a 3G GSM Serve node and a 4G LTE Home node, in accordance with an embodiment of the present invention.

FIG. 8 illustrates a GTP firewall component diagram for the 3G GSM Serve and the 4G LTE Home element of FIG. 7. In this embodiment the network configuration 800 includes a GTP firewall 825 positioned between an SGSN Serve operator 820 and a PGW Home operator 830. Since the SGSN Serve operates under the 3G GSM protocol and the PGW Home operates under the 4G LTE protocol, the GTP firewall 825 must provide interoperability in addition to block/allow functionality. For example, for 3G GSM to 4G LTE interoperability, the GTP firewall 825 will map "Create PDP Context Request" messages received on the 3G GSM side to "Create Session Request" messages on the 4G LTE side and will apply allow/block rules on both the 3G GSM side and the 4G LTE side. This protocol mapping and allowing/blocking scenario applies for all 3G GSM GTP-C v1 messages that are mapped to their equivalent 4G LTE GTP-C v2 messages, along with their respective Information Elements.

The GTP firewall 825 functionality may include, validating serving SGSNs (3G) and SGWs (4G) for allowed or blocked traffic, validating home GGSN (3G) and PGWs (4G) for allowed or blocked traffic, validating Home-Serve roaming partner relationships to only allow traffic between home operators and their roaming partners, validating correct formatting of each Information Element (IE), validating the presence of mandatory IEs for each GTP message type, mapping IEs to correct GTP message types and GTP protocol version, validating correct IE type belonging to specific GTP message type, performing traffic rate monitoring validation from SGSNs/SGWs to GGSNs/PGWs, performing traffic rate monitoring validation from GGSNs/PGWs to SGSNs/SGWs and establishing interoperability between 3G GSM and 4G LTE networks.

In general, while mobile network users are roaming, their data sessions move between 3G GSM and 4G LTE networks based on what coverage they have in that area. The GTP firewall of the present invention supports both scenarios. If the Serve network only supports 3G GSM, and the Home network only supports 4G LTE, the GTP firewall will provide interoperability between 3G GSM and 4G LTE (by mapping data signaling messages between GTP-C v1 on 3G side and GTP-C v2 on 4G side) along with providing GTP firewall service across all planes (Control and User Plane). Analogously, if the Serve network only supports 4G LTE and the Home network only supports 3G GSM, the GTP firewall will provide interoperability between 4G LTE and 3G GSM (by mapping data signaling messages between GTP-C v2 on 4G side and GTP-C v1 on 3G side) along with providing GTP Firewall service across all planes (Control and User Plane). Thus, the GTP firewall supports 3G GSM, 4G LTE, and enables interoperability between the two (Serve 3G and Home 4G or Serve 4G and Home 3G) as mobile network users roam across these networks, thereby ensuring complete coverage.

GTP firewall interoperability functionality also covers operators that only have 3G GSM Network but would like to enable their subscribers to roam in both 3G and 4G LTE networks with a GTP firewall protection service. Analogously, the GTP Firewall interoperability functionality also covers operators that only have 4G LTE Network but would like to enable their subscribers to roam in both 3G and 4G LTE networks with GTP firewall protection service.

In the various illustrated embodiments, some of the Information Elements mapping is performed as follows:

| GTP-C v2 Create Session Request IE's | GTP-C v1 Create PDP Context Request IE's |
|---|---|
| IMSI | IMSI |
| ULI | ULI |
| MCC/MNC of Serving Network | RAI |
| APN | APN |
| APN Restriction | APN Restriction |
| Aggregate Maximum Bit Rate (AMBR) | Aggregate Maximum Bit Rate (AMBR) |
| From multiple v2 parameters | QOS (multiple sub parameters) |
| ... | ... |

| GTP-C v1 Create PDP Context Response IE's | GTP-C v2 Create Session Response IE's |
|---|---|
| Cause | Cause |
| GTP Firewall Restart Counter | Recovery |
| APN Restriction | APN Restriction |
| Aggregate Maximum Bit Rate (AMBR) | AMBR |
| Protocol Configuration Options (PCO) | Protocol Configuration Options (PCO) |
| QoS | Bearer Context, Bearer QoS |
| Charging Gateway Address | Charging Gateway Address |
| ... | ... |

| GTP-C v2 Modify Bearer Request IE's | GTP-C v1 Update PDP Context Request IE's |
|---|---|
| MCC/MNC of Serving Network | RAI |
| ULI | ULI |
| Aggregate Maximum Bit Rate (AMBR) | QoS (AMBR) |
| RAT Type | RAT Type |
| UE Time Zone | MS Time Zone |
| ... | ... |

Figure 9:
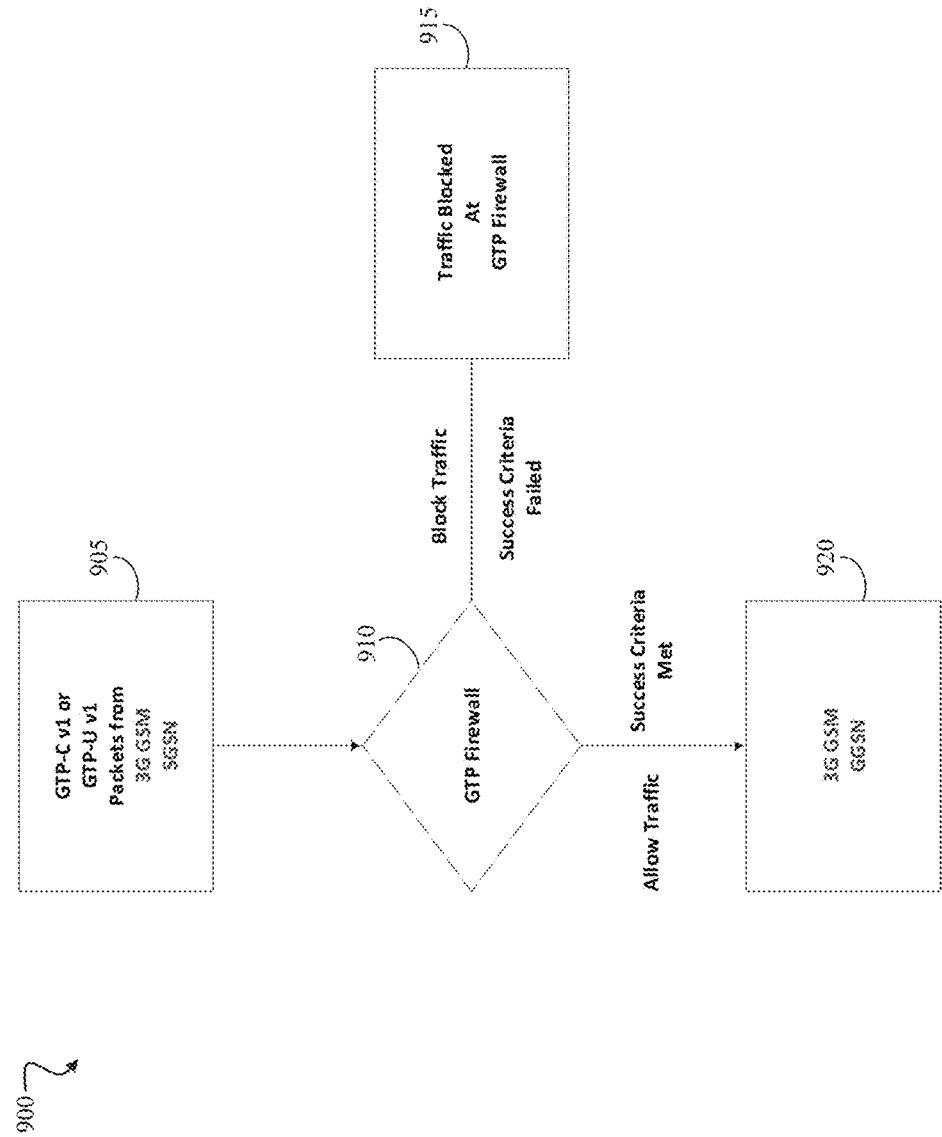
FIG. 9 is a flow diagram illustrating GTP firewall allowing and blocking of traffic from 3G SGSN to 3G GGSN for 3G GSM, in accordance with an embodiment of the present invention.

FIG. 9 provides a flowchart 900 illustrating the allowing and/or blocking provided by the GTP firewall of the present invention for the transmission of traffic from in a 3G SGSN Serve to 3G GGSN Home operating under the 3G GSM protocol. As shown in FIG. 9, GTP-C v1 or GTP-U v1 packets received at a 3G SGSN 905 are routed to the GTP firewall 910. The GTP firewall 910 utilizes a predetermined set of criteria and rules to determine whether or not to transmit the traffic to its destination. If the GTP firewall 910 determines that the traffic meets the success criteria, the traffic is transmitted to the 3G GGSN 920. If the GTP firewall 910 determines that the traffic does not meet the success criteria, the GTP firewall 910 blocks the transmission of the traffic to its destination 915.

Figure 10:
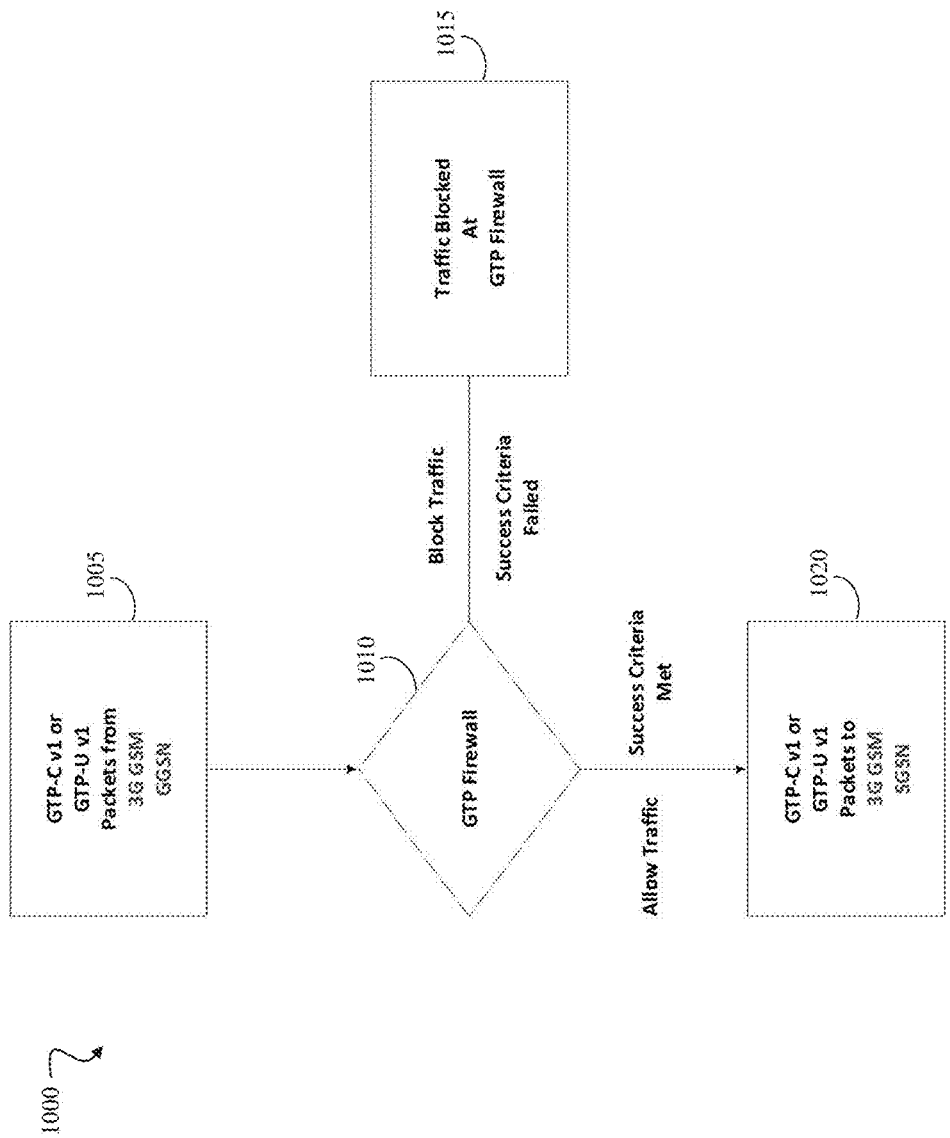
FIG. 10 is a flow diagram illustrating GTP firewall allowing and blocking of traffic from 3G GGSN to 3G SGSN for 3G GSM, in accordance with an embodiment of the present invention.

FIG. 10 provides a flowchart 1000 illustrating the allowing and/or blocking provided by the GTP firewall of the present invention for the transmission of traffic from in a 3G GGSN Home to 3G SGSN Serve operating under the 3G GSM protocol. As shown in FIG. 10, GTP-C v1 or GTP-U v1 packets received at a 3G GGSN 1005 are routed to the GTP firewall 1010. The GTP firewall 1010 utilizes a predetermined set of criteria and rules to determine whether or not to transmit the traffic to its destination. If the GTP firewall 1010 determines that the traffic meets the success criteria, the traffic is transmitted to the 3G SGSN 1020. If the GTP firewall 1010 determines that the traffic does not meet the success criteria, the GTP firewall 1010 blocks the transmission of the traffic to its destination 1015.

Figure 11:
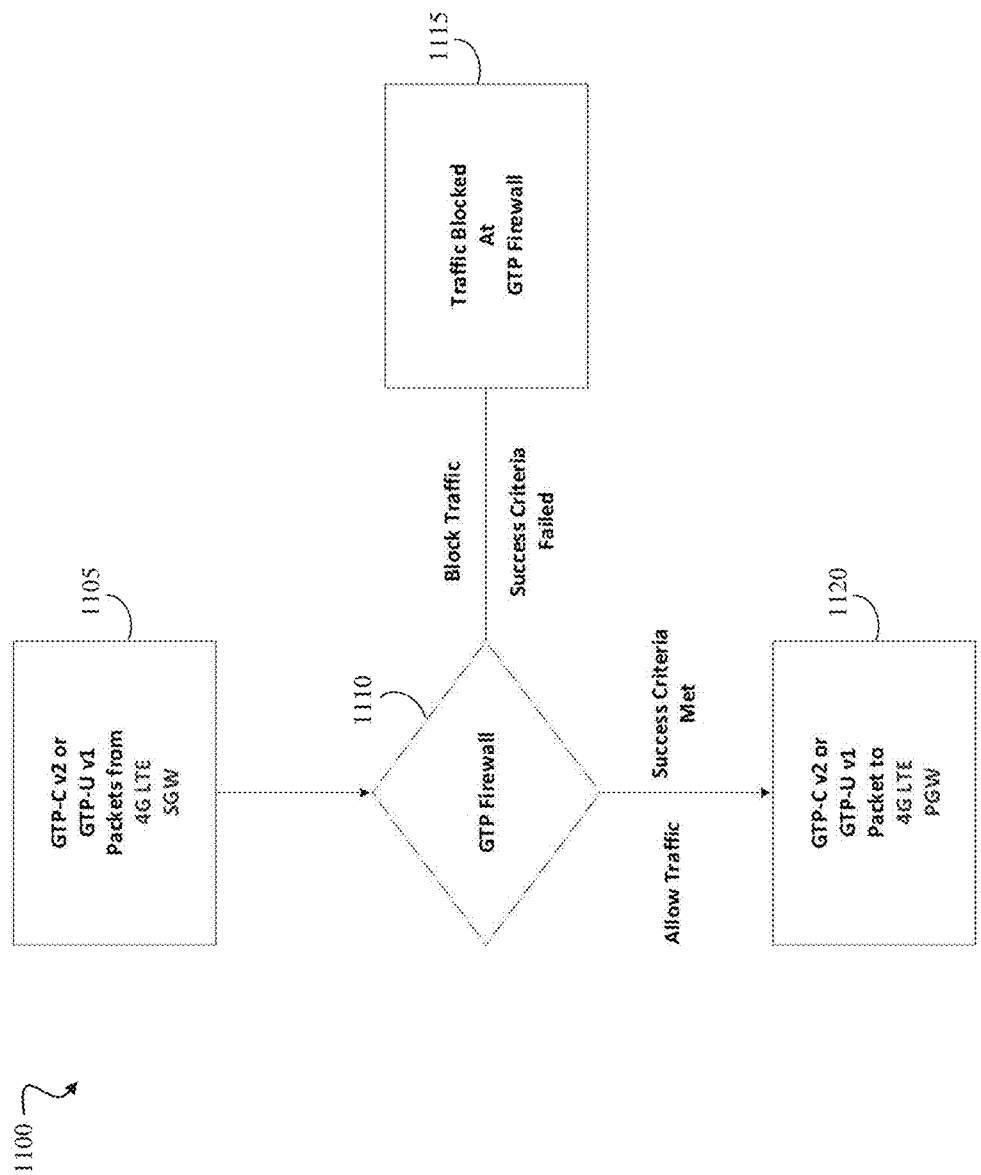
FIG. 11 is a flow diagram illustrating GTP firewall allowing and blocking of traffic from 4G SGW to 4G PGW for 4G LTE, in accordance with an embodiment of the present invention.

FIG. 11 provides a flowchart 1100 illustrating the allowing and/or blocking provided by the GTP firewall of the present invention for the transmission of traffic from a 4G SGW Serve to a 4G PGW Home operating under the 4G LTE protocol. As shown in FIG. 11, GTP-C v2 or GTP-U v1 packets received at a 4G SGW 1105 are routed to the GTP firewall 1110. The GTP firewall 1110 utilizes a predetermined set of criteria and rules to determine whether or not to transmit the traffic to its destination. If the GTP firewall 1110 determines that the traffic meets the success criteria, the traffic is transmitted to the 4G PGW 1120. If the GTP firewall 1110 determines that the traffic does not meet the success criteria, the GTP firewall 1110 blocks the transmission of the traffic to its destination 1115.

Figure 12:
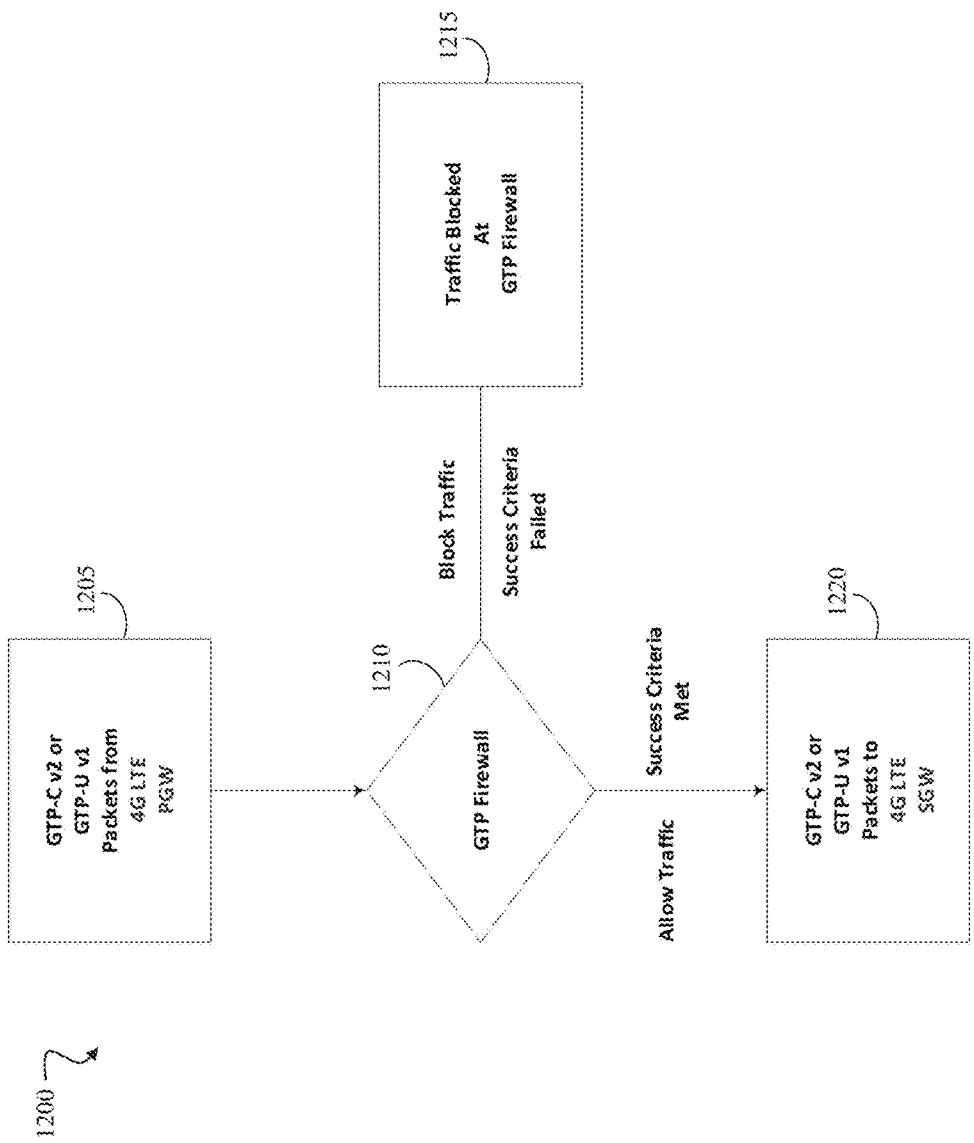
FIG. 12 is a flow diagram illustrating GTP firewall allowing and blocking of traffic from 4G PGW to 4G SGW for 4G LTE, in accordance with an embodiment of the present invention.

FIG. 12 provides a flowchart 1200 illustrating the allowing and/or blocking provided by the GTP firewall of the present invention for the transmission of traffic from a 4G PGW Home to a 4G SGW Serve operating under the 4G LTE protocol. As shown in FIG. 12, GTP-C v2 or GTP-U v1 packets received at a 4G PGW 1205 are routed to the GTP firewall 1210. The GTP firewall 1210 utilizes a predetermined set of criteria and rules to determine whether or not to transmit the traffic to its destination. If the GTP firewall 1210 determines that the traffic meets the success criteria, the traffic is transmitted to the 4G SGW 1220. If the GTP firewall 1210 determines that the traffic does not meet the success criteria, the GTP firewall 1210 blocks the transmission of the traffic to its destination 1215.

FIG. 12 provides a flowchart 1200 illustrating the allowing and/or blocking provided by the GTP firewall of the present invention for the transmission of traffic from a 4G PGW Home to a 4G SGW Serve operating under the 4G LTE protocol. As shown in FIG. 12, GTP-C v2 or GTP-U v1 packets received at a 4G PGW 1205 are routed to the GTP firewall 1210. The GTP firewall 1210 utilizes a predetermined set of criteria and rules to determine whether or not to transmit the traffic to its destination. If the GTP firewall 1210 determines that the traffic meets the success criteria, the traffic is transmitted to the 4G SGW 1220. If the GTP firewall 1210 determines that the traffic does not meet the success criteria, the GTP firewall 1210 blocks the transmission of the traffic to its destination 1215.

Figure 13:
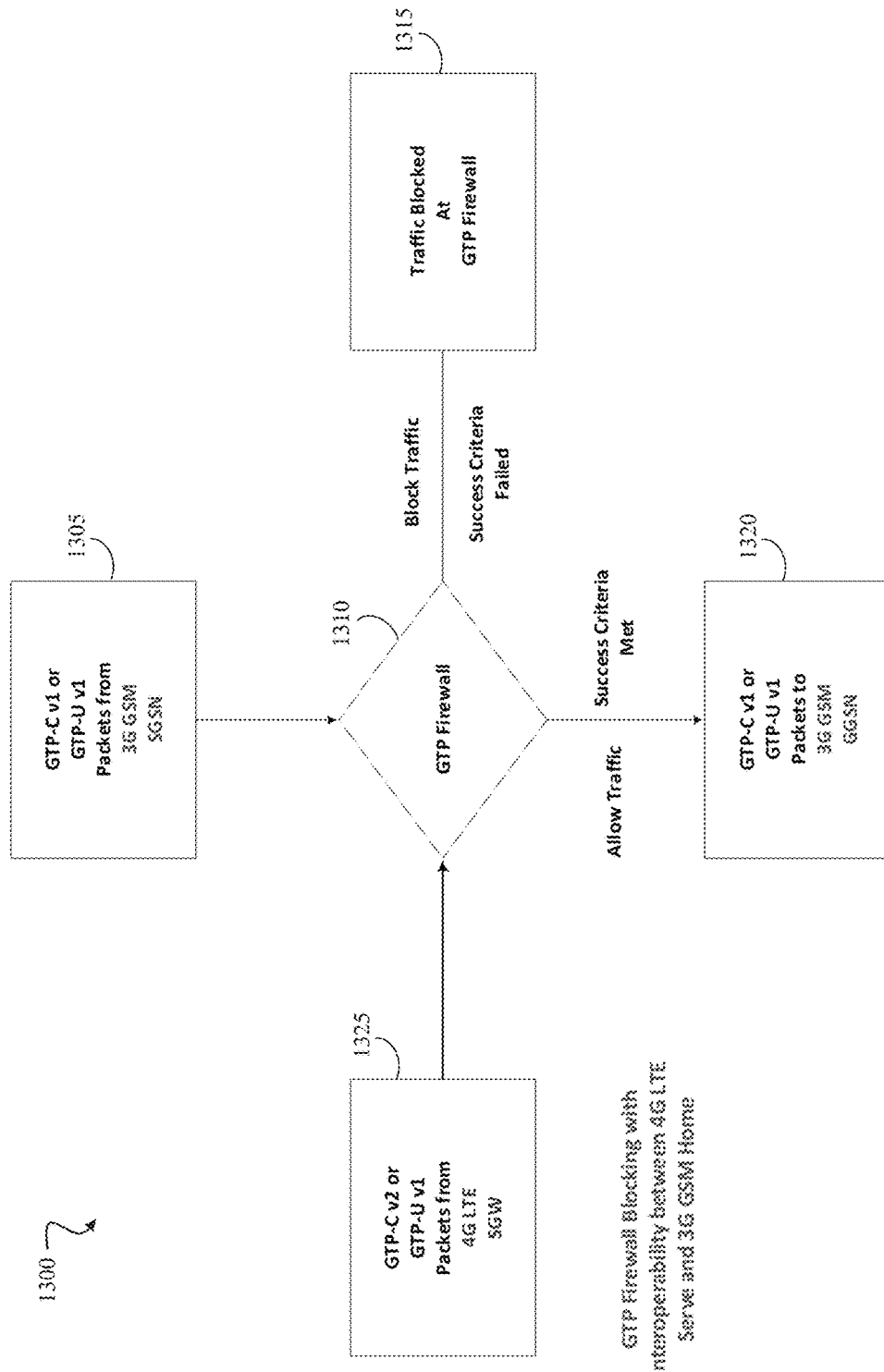
FIG. 13 is a flow diagram illustrating GTP firewall allowing and blocking of traffic from 3G SGSN or 4G SGW to 3G GGSN, in accordance with an embodiment of the present invention.

FIG. 13 provides a flowchart 1300 illustrating the allowing and/or blocking in addition to the interoperability between protocols, provided by the GTP firewall of the present invention for the transmission of traffic from a 3G SGSN Serve or a 4G SGW Serve to a 3G GGSN Home operating under the 3G GSM protocol. As shown in FIG. 13, GTP-C v1 or GTP-U v1 packets received at a 3G SGSN 1305 are routed to the GTP firewall 1310. The GTP firewall 1310 utilizes a predetermined set of criteria and rules to determine whether or not to transmit the traffic to its destination. If the GTP firewall 1310 determines that the traffic meets the success criteria, the traffic is transmitted to the 3G GGSN 1320. If the GTP firewall 1310 determines that the traffic does not meet the success criteria, the GTP firewall 1310 blocks the transmission of the traffic to its destination 1315.

Additionally, for transmission of the packets from the 4G SGW serve 1325 to the 3G GGSN Home 1320, GTP-C v2 or GTP-U v1 packets received at a 4G SGW 1325 are routed to the GTP firewall 1310. The GTP firewall 1310 first executes interoperability procedures on the packets to convert the messages from the 4G LTE protocol to the 3G GSM protocol. The GTP firewall 1310 then utilizes a predetermined set of criteria and rules to determine whether or not to transmit the traffic to its destination. If the GTP firewall 1310 determines that the traffic meets the success criteria, the traffic is transmitted to the 3G GGSN 1320. If the GTP firewall 1310 determines that the traffic does not meet the success criteria, the GTP firewall 1310 blocks the transmission of the traffic to its destination 1315.

Figure 14:
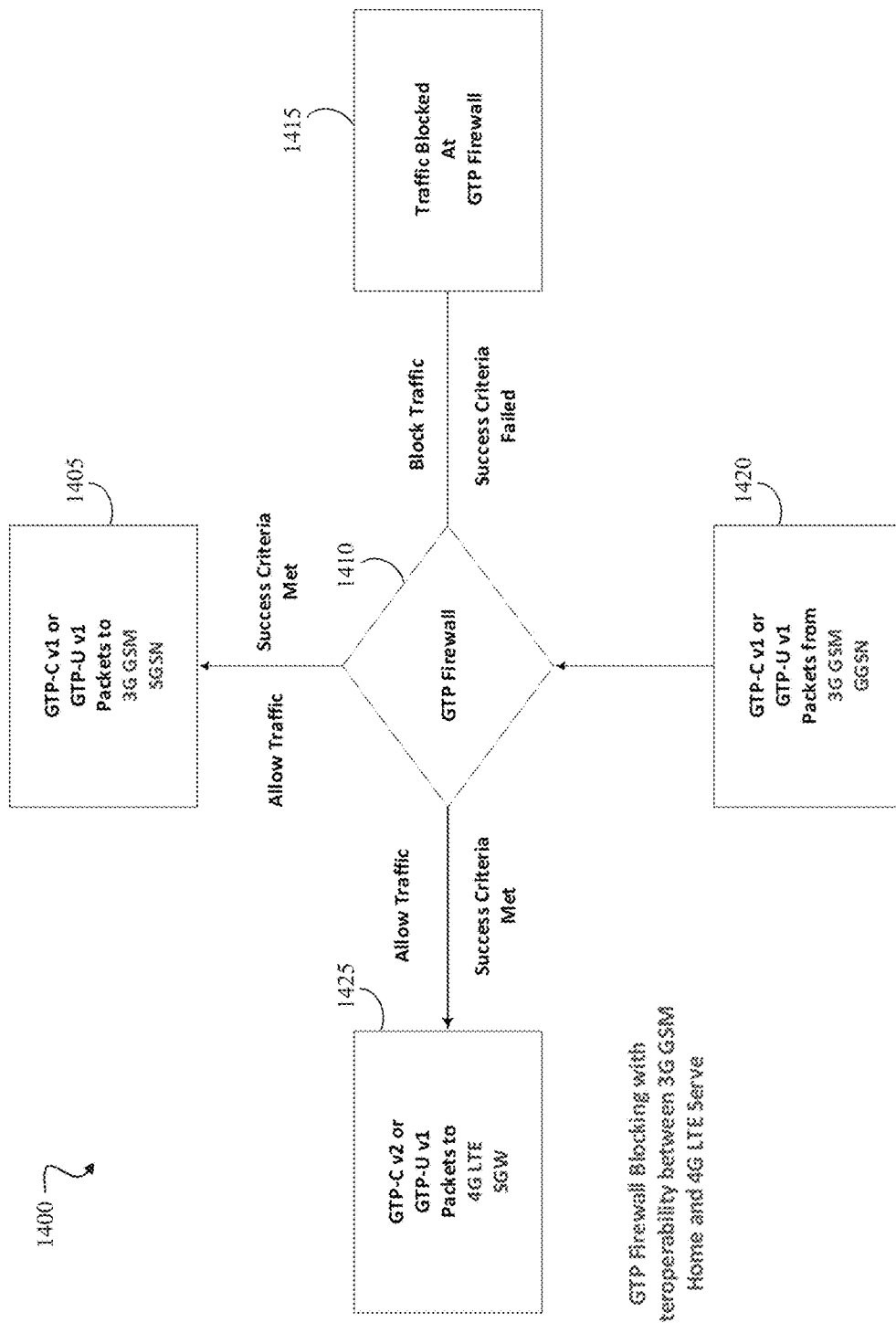
FIG. 14 is a flow diagram illustrating GTP firewall allowing and blocking of traffic from 3G GGSN to 3G SGSN or 4G SGW, in accordance with an embodiment of the present invention.

FIG. 14 provides a flowchart 1400 illustrating the allowing and/or blocking in addition to the interoperability between protocols, provided by the GTP firewall of the present invention for the transmission of traffic from a 3G GGSN Home to a 4G SGW Serve operating under the 4G LTE protocol or a 3G SGSN Serve operating under the 3G GSM protocol. As shown in FIG. 14, GTP-C v1 or GTP-U v1 packets from a 3G GGSN 1420 are routed to the GTP firewall 1410. The GTP firewall 1410 utilizes a predetermined set of criteria and rules to determine whether or not to transmit the traffic to its destination. If the GTP firewall 1410 determines that the traffic meets the success criteria, the traffic is transmitted to the 3G SGSN 1405. If the GTP firewall 1410 determines that the traffic does not meet the success criteria, the GTP firewall 1410 blocks the transmission of the traffic to its destination 1415.

Additionally, for transmission of the packets from the 3G GGSN Home 1420 to the 4G SGW Serve 1425, the GTP-C v1 or GTP-U v1 packets from the 3G GGSN 1420 are routed to the GTP firewall 1410. The GTP firewall 1410 first executes interoperability procedures on the packets to convert the messages from the 3G GSM protocol to the 4G LTE protocol. The GTP firewall 1410 then utilizes a predetermined set of criteria and rules to determine whether or not to transmit the traffic to its destination. If the GTP firewall 1410 determines that the traffic meets the success criteria, the traffic is transmitted to the 4G SGW 1425. If the GTP firewall 1410 determines that the traffic does not meet the success criteria, the GTP firewall 1410 blocks the transmission of the traffic to its destination 1415.

Figure 15:
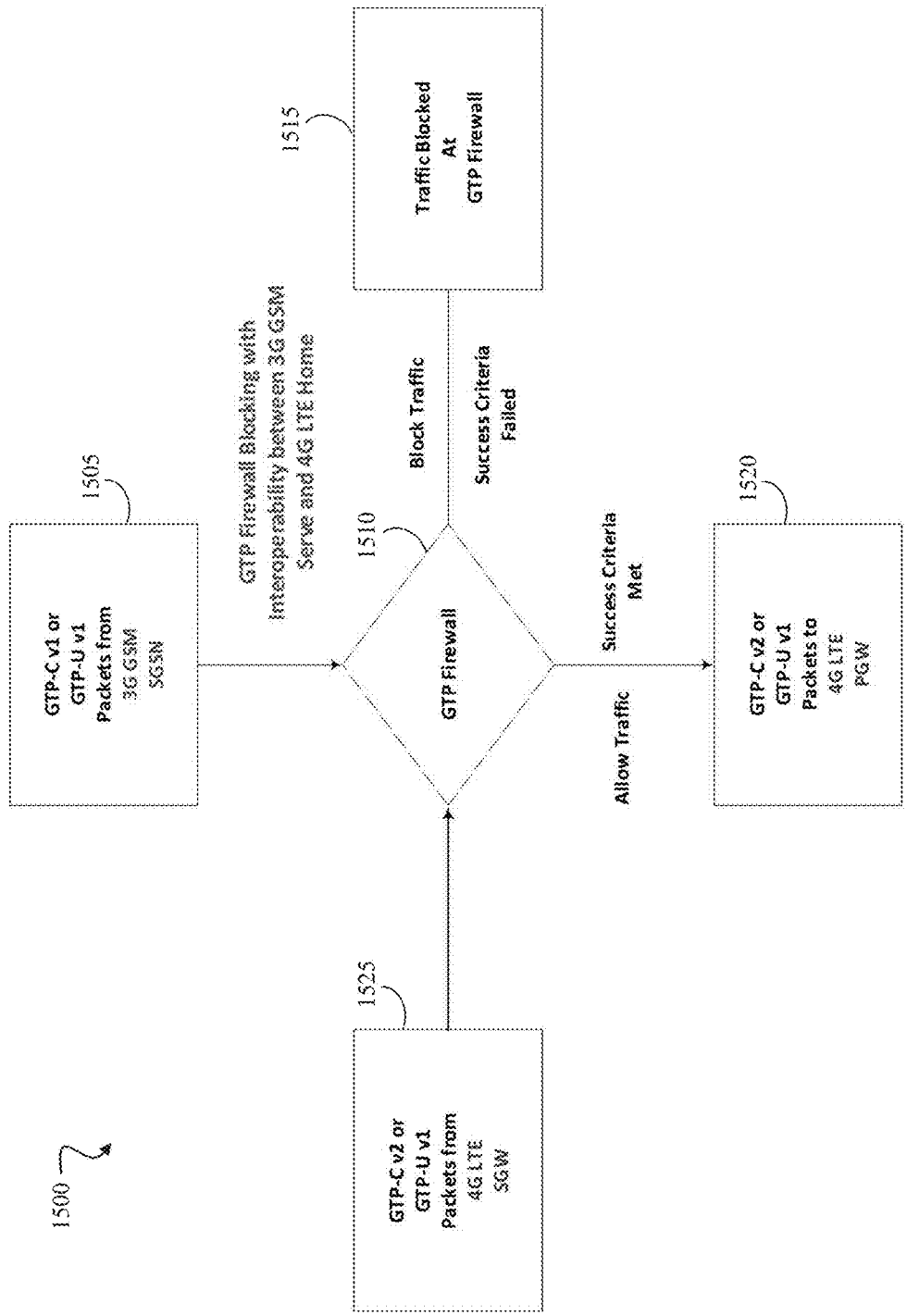
FIG. 15 is a flow diagram illustrating GTP firewall allowing and blocking of traffic from 3G SGSN or 4G SGW to 4G PGW, in accordance with an embodiment of the present invention.

FIG. 15 provides a flowchart 1500 illustrating the allowing and/or blocking in addition to the interoperability between protocols, provided by the GTP firewall of the present invention for the transmission of traffic from a 3G SGSN Serve operating under the 3G GSM protocol or a 4G SGW Serve operating under the 4G LTE protocol to a 4G PGW Home operating under the 4G LTE protocol. As shown in FIG. 15, GTP-C v2 or GTP-U v1 packets from a 4G SGW 1525 are routed to the GTP firewall 1510. The GTP firewall 1510 utilizes a predetermined set of criteria and rules to determine whether or not to transmit the traffic to its destination. If the GTP firewall 1510 determines that the traffic meets the success criteria, the traffic is transmitted to the 4G PGW 1520. If the GTP firewall 1510 determines that the traffic does not meet the success criteria, the GTP firewall 1510 blocks the transmission of the traffic to its destination 1515.

Additionally, for transmission of the packets from the 3G SGSN Serve 1505 to the 4G PGW Home 1520, the GTP-C v1 or GTP-U v1 packets from the 3G SGSN 1505 are routed to the GTP firewall 1510. The GTP firewall 1510 first executes interoperability procedures on the packets to convert the messages from the 3G GSM protocol to the 4G LTE protocol. The GTP firewall 1510 then utilizes a predetermined set of criteria and rules to determine whether or not to transmit the traffic to its destination. If the GTP firewall 1510 determines that the traffic meets the success criteria, the traffic is transmitted to the 4G PGW 1520. If the GTP firewall 1510 determines that the traffic does not meet the success criteria, the GTP firewall 1510 blocks the transmission of the traffic to its destination 1515.

Figure 16:
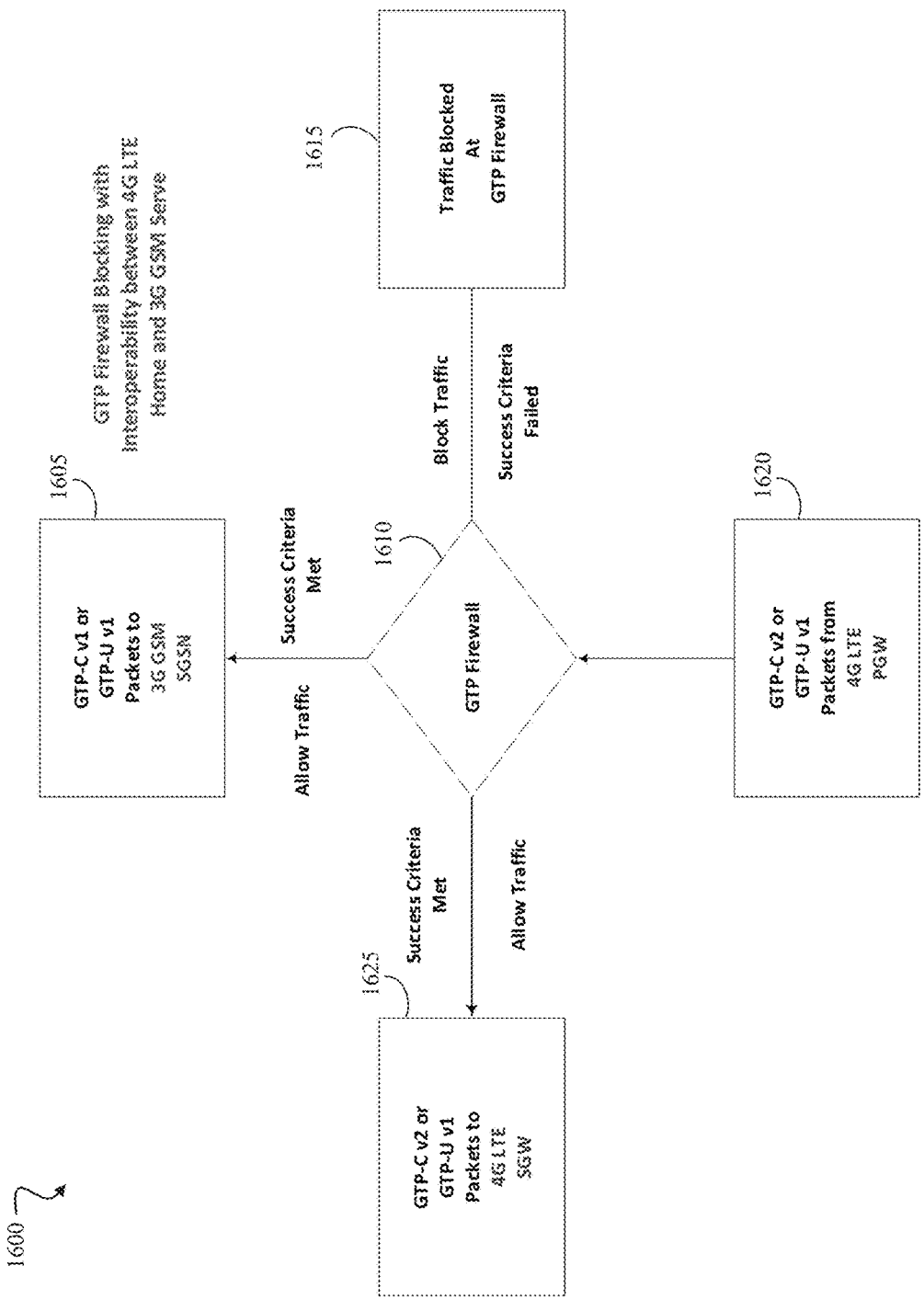
FIG. 16 is a flow diagram illustrating GTP firewall allowing and blocking of traffic from 4G PGW to 3G SGSN or 4G SGW, in accordance with an embodiment of the present invention.

FIG. 16 provides a flowchart 1600 illustrating the allowing and/or blocking in addition to the interoperability between protocols, provided by the GTP firewall of the present invention for the transmission of traffic from a 4G PGW Home operating under the 4G LTE protocol to a 3G SGSN Serve operating under the 3G GSM protocol or to a 4G SGW Serve operating under the 4G LTE protocol. As shown in FIG. 16, GTP-C v2 or GTP-U v1 packets from a 4G PGW 1620 are routed to the GTP firewall 1610. The GTP firewall 1610 utilizes a predetermined set of criteria and rules to determine whether or not to transmit the traffic to its destination. If the GTP firewall 1610 determines that the traffic meets the success criteria, the traffic is transmitted to the 4G SGW 1625. If the GTP firewall 1610 determines that the traffic does not meet the success criteria, the GTP firewall 1610 blocks the transmission of the traffic to its destination 1615.

Additionally, for transmission of the packets from the 4G PGW Home 1620 to the 3G SGSN Serve 1605, the GTP-C v2 or GTP-U v1 packets from the 4G PGW 1620 are routed to the GTP firewall 1610. The GTP firewall 1610 first executes interoperability procedures on the packets to convert the messages from the 4G LTE protocol to the 3G GSM protocol. The GTP firewall 1610 then utilizes a predetermined set of criteria and rules to determine whether or not to transmit the traffic to its destination. If the GTP firewall 1610 determines that the traffic meets the success criteria, the traffic is transmitted to the 3G SGSN 1605. If the GTP firewall 1610 determines that the traffic does not meet the success criteria, the GTP firewall 1610 blocks the transmission of the traffic to its destination 1615.

Accordingly, in various embodiments, the present invention provides a GTP firewall that will allow or block GTP-C v1 messages from specific SGSN and GTP-C v2 messages from specific SGW to prevent fraudulent activity from occurring from any specific serving node. Additionally, GTP traffic from specific SGSN (3G) or SGW (4G) nodes can be blocked going to specific home operators, including 3G GSM to 4G LTE and 4G LTE to 3G GSM protocol interoperability provided by the GTP firewall. In operation, individual Information Elements (IEs) within GTP-C v1 and GTP-C v2 messages are monitored by the GTP firewall based upon the home and serve operator configuration, as well as messages and IEs mapped from GTP-C v1 to GTP-C v2 for 3G GSM to 4G LTE interoperability and GTP-C v2 to GTP-C v1 for 4G LTE to 3G GSM interoperability.

Hardware and Software Examples

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

| Abbreviations: | |
| --- | --- |
| 3G | 3$^{rd}$ Generation (GSM) |
| 4G | 4$^{th}$ Generation (LTE) |
| LTE | Long Term Evolution |
| SGSN | Serving GPRS Support Node used in 3G GSM |
| GGSN | Gateway GPRS Support Node used in 3G GSM |
| IE | Information Element |
| SGW | Serving Gateway used in 4G LTE |
| PGW | PDN (Packet Data Network) Gateway used in 4G LTE |
| GTP | GPRS Tunneling Protocol |
| GTP-C | GTP Control Plane |
| GTP-U | GTP User Plane |
| GPRS | General Packet Radio Service |
| GSM | Global System for Mobile Communication |
| MCC | Mobile Country Code |
| MNC | Mobile Network Code |

| Abbreviations: | |
| --- | --- |
| v1 | Version 1 |
| v2 | Version 2 |

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of providing firewall services between mobile IP-based networks, the method comprising:
    monitoring traffic on an IP-based (Internet Protocol) network using a GTP (General Packet Radio Service (GPRS) Tunneling Protocol) firewall, wherein the GTP firewall is positioned between a Serve side of the IP network operating under a first protocol and a Home side of the IP network operating under a second protocol, and wherein the traffic comprises data signaling messages;
    providing protocol interoperability between the first protocol and the second protocol by mapping the data signaling messages received at the Serve side using the first protocol to create data signaling messages at the Home side using the second protocol;
    providing protocol interoperability between the second protocol and the first protocol by mapping the data signaling messages received at the Home side using the second protocol to create data signaling messages at the Serve side using the first protocol;
    blocking or allowing the transmission of traffic through the GTP firewall based at least upon the data signaling messages at the Serve side and at the Home side of the IP Network, wherein blocking or allowing the transmission of traffic through the GTP firewall based at least upon the data signaling messages at the Serve side and at the Home side further comprises;
        routing Access Point Names (APNs) from a home operator on the Home side of the IP network to an operator-specific GTP firewall public IP address at the GTP firewall;
        blocking or allowing the transmission of traffic through the GTP firewall based upon the public IP address; and
        transmitting the allowed traffic to a true destination of the traffic based upon one or more of the APN, subscriber International Mobile Subscriber Identity (IMSI) and session Tunnel End Point Identifier (TEID).

2. The method of claim 1, wherein the IP-based network is selected from a Global System for Mobile Communications (GSM) Roaming Exchange (GRX) network and an Internetwork Packet Exchange (IPX) network.

3. The method of claim 1, wherein the traffic is selected from, GTP-C v1 (General Packet Radio Service (GPRS) Tunneling Protocol Control Plane Version-1), GTP-C v2 (General Packet Radio Service (GPRS) Tunneling Protocol Control Plane Version-2) and GTP-U v1 (General Packet Radio Service (GPRS) Tunneling Protocol User Plane Version-1).

4. The method of claim 1, wherein the traffic further comprises data traffic.

5. The method of claim 1, wherein the first protocol is a 3G GSM protocol and the second protocol is a 4G LTE (Long Term Evolution) protocol.

6. The method of claim 1, wherein the first protocol is a 4G LTE protocol and the second protocol is a 3G GSM protocol.

7. The method of claim 1, wherein blocking or allowing the transmission of traffic through the GTP firewall based at least upon the data signaling messages at the Serve side and at the Home side further comprises, allowing the transmission of traffic through the GTP firewall from trusted Serve side operators and from trusted Home side operators.

8. The method of claim 1, wherein blocking or allowing the transmission of traffic through the GTP firewall based at least upon the data signaling messages at the Serve side and at the Home side further comprises, blocking the transmission of traffic through the GTP firewall from un-trusted Serve side operators and from un-trusted Home side operators.

9. The method of claim 1, wherein blocking or allowing the transmission of traffic through the GTP firewall based at least upon the data signaling messages at the Serve side and at the Home side further comprises, blocking or allowing the transmission of traffic through the GTP firewall based upon a location of a serve operator on the Serve side of the IP network or a location of a home operator on the Home side of the IP network.

10. The method of claim 1, wherein blocking or allowing the transmission of traffic through the GTP firewall based at least upon the data signaling messages at the Serve side and at the Home side further comprises, blocking or allowing the transmission of traffic through the GTP firewall based upon one or more IP addresses of a home operator on the Home side of the IP network or based upon one or more IP addresses of a serve operator on the Serve side of the IP network.

11. The method of claim 1, wherein blocking or allowing the transmission of traffic through the GTP firewall based at least upon the data signaling messages at the Serve side and at the Home side further comprises, blocking or allowing the transmission of traffic based upon GTP Control Plane (GTP-C) v1 Information Elements (IEs), GTP-C v2 IEs or GTP User Plane (GTP-U) IEs at both the Serve side and the Home side of the IP network.

12. The method of claim 1, wherein the data signaling messages received on the Serve side are 3G GSM Create PDP Contest Request messages and the data signaling messages on the Home side are 4G LTE Create Session Request messages.

13. The method of claim 1, wherein the data signaling messages received on the Serve side are 4G LTE Create Session Request messages and the data signaling messages on the Home side are 3G GSM Create PDP Contest Request messages.

14. The method of claim 1, wherein blocking or allowing the transmission of traffic through the GTP firewall based at least upon the data signaling messages at the Serve side and at the Home side further comprises one or more of:

validating a home-serve roaming partner relationship and blocking or allowing the transmission of traffic through the GTP firewall based upon the validation of the home-serve roaming partner relationship;

validating correct formatting for one or more IEs of the data signaling messages and blocking or allowing the transmission of traffic through the GTP firewall based upon the validation of the IEs;

validating a presence of mandatory IEs for one or more of GTP-C v1, GTP-C v2 or GTP-U and blocking or allowing the transmission of traffic through the GTP firewall based upon the validation of the presence of mandatory IEs;

validating a correct length of an IE and blocking or allowing the transmission of traffic through the GTP firewall based upon the validation of the correct IE length;

validating correct IE type based on of GTP-C v1, GTP-C v2 or GTP-U and blocking or allowing the transmission of traffic through the GTP firewall based upon the validation of the correct IE type; and monitoring a traffic rate and blocking or allowing the transmission of traffic through the GTP firewall based upon the traffic rate.

15. A method of providing firewall services between mobile IP networks, the method comprising:

monitoring traffic on an IP (Internet Protocol) network using a GTP (General Packet Radio Service (GPRS) Tunneling Protocol) firewall, wherein the GTP firewall is positioned between a Serve side of the IP network comprising one or more serve operators operating under a first protocol and a Home side of the IP network comprising one or more home operators operating under a second protocol, and wherein the traffic comprises data signaling messages;

providing protocol interoperability between the first protocol and the second protocol by mapping the data signaling messages received at the Serve side using the first protocol to create data signaling messages at the Home side using the second protocol;

providing protocol interoperability between the second protocol and the first protocol by mapping the data signaling messages received at the Home side using the second protocol to create data signaling messages at the Serve side using the first protocol;

blocking or allowing the transmission of traffic from the one or more serve operators to the one or more home operators based at least upon the data signaling messages at the Serve side and at the Home side of the IP Network, wherein blocking or allowing the transmission of traffic from the one or more serve operators to the one or more home operators based at least upon the data signaling messages at the Serve side and at the Home side of the IP network further comprises;

routing Access Point Names (APNs) from a home operator on the Home side of the IP network to an operator-specific GTP firewall public IP address at the GTP firewall;

blocking or allowing the transmission of traffic through the GTP firewall based upon the public IP address; and transmitting the allowed traffic to a true destination of the traffic based upon one or more of the APN, subscriber International Mobile Subscriber Identity (IMSI) and session Tunnel End Point Identifier (TEID).

16. A mobile IP network system comprising:

a Serve side of an IP network comprising one or more serve operators operating under a first protocol;

a Home side on the IP network comprising one or more home operators operating under a second protocol;

a GTP (General Packet Radio Service (GPRS) Tunneling Protocol) firewall, wherein the GTP firewall positioned between the Serve side of the IP network and the Home side of the IP network, wherein the traffic comprises data signaling messages and wherein the GTP firewall is configured to;

monitor traffic on the IP (Internet Protocol) network;

provide protocol interoperability between the first protocol and the second protocol by mapping the data signaling messages received at the Serve side using the first protocol to create data signaling messages at the Home side using the second protocol;

provide protocol interoperability between the second protocol and the first protocol by mapping the data signaling messages received at the Home side using the second protocol to create data signaling messages at the Serve side using the first protocol;

block or allow the transmission of traffic through the GTP firewall based at least upon the data signaling messages at the Serve side and at the Home side of the IP Network, wherein the GTP firewall is further configured to;

route Access Point Names (APNs) from a home operator on the Home side of the IP network to an operator-specific GTP firewall public IP address at the GTP firewall;

block or allow the transmission of traffic through the GTP firewall based upon the public IP address; and transmit the allowed traffic to a true destination of the traffic based upon one or more of the APN, subscriber International Mobile Subscriber Identity (IMSI) and session Tunnel End Point Identifier (TEID).

17. The system of claim 16, wherein the traffic is selected from, GTP-C v1 (General Packet Radio Service (GPRS) Tunneling Protocol Control Plane Version-1), GTP-C v2 (General Packet Radio Service (GPRS) Tunneling Protocol Control Plane Version-2) and GTP-U v1 (General Packet Radio Service (GPRS) Tunneling Protocol User Plane Version-1).

18. The system of claim 16, wherein the first protocol is a 3G GSM protocol and the second protocol is a 4G LTE (Long Term Evolution) protocol.

19. The system of claim 16, wherein the first protocol is a 4G LTE protocol and the second protocol is a 3G GSM protocol.

\* \* \* \* \*